US012681960B2

(12) United States Patent
Cao et al.

(10) Patent No.: US 12,681,960 B2
(45) Date of Patent: Jul. 14, 2026

(54) METHOD AND APPARATUS FOR COMPRESSING AND DECOMPRESSING THREE-DIMENSIONAL (3D) MAP

(71) Applicant: HUAWEI TECHNOLOGIES CO., LTD., Shenzhen (CN)

(72) Inventors: Xiaoran Cao, Hangzhou (CN); Kangying Cai, Beijing (CN); Pei Wang, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 272 days.

(21) Appl. No.: 18/526,734

(22) Filed: Dec. 1, 2023

(65) Prior Publication Data

US 2024/0112372 A1 Apr. 4, 2024

Related U.S. Application Data

(63) Continuation of application No. PCT/CN2021/105623, filed on Jul. 9, 2021.

(30) Foreign Application Priority Data

Jun. 4, 2021 (WO) ................ PCT/CN2021/098482
Jun. 4, 2021 (WO) ................ PCT/CN2021/098483

(51) Int. Cl.
  *G06T 17/05* (2011.01)
  *G06F 16/29* (2019.01)
    (Continued)

(52) U.S. Cl.
  CPC ............ *G06F 16/29* (2019.01); *G06F 16/487* (2019.01); *G06T 9/00* (2013.01); *G06T 17/00* (2013.01); *G06T 17/05* (2013.01)

(58) Field of Classification Search
  None
  See application file for complete search history.

(56) References Cited

U.S. PATENT DOCUMENTS

2020/0107033 A1    4/2020  Joshi et al.
2021/0319592 A1*  10/2021  Tsai ...................... G06T 17/205
2023/0035807 A1*   2/2023  Sugio ...................... G06T 9/001

FOREIGN PATENT DOCUMENTS

CN      102168983 A    8/2011
CN      107590814 A    1/2018
    (Continued)

OTHER PUBLICATIONS

Thanou et al., "Graph-Based Compression of Dynamic 3D Point Cloud Sequences," IEEE Transactions on Image Processing, vol. 25, No. 4, Total 14 pages (Apr. 2016).
    (Continued)

*Primary Examiner* — Ryan Mcculley
(74) *Attorney, Agent, or Firm* — Leydig, Voit & Mayer, Ltd.

(57) ABSTRACT

Embodiments of this application provide methods and apparatuses for compressing and decompressing a three-dimensional (3D) map, to reduce a data volume of a 3D map. The method for compressing a 3D map includes: obtaining a 3D map descriptor, where the 3D map descriptor corresponds to at least one 3D map point of the 3D map; performing binarization on a relationship between the 3D map descriptor and at least one preset threshold vector to obtain binary data; and performing quantization on a difference between the 3D map descriptor and the at least one preset threshold vector to obtain quantized data.

13 Claims, 11 Drawing Sheets

Obtain a 3D map descriptor ⟋ S101

Perform binarization on a relationship between the 3D map descriptor and at least one preset threshold vector to obtain binary data ⟋ S102

Perform quantization on a difference between the 3D map descriptor and the at least one preset threshold vector to obtain quantized data ⟋ S103

(51) Int. Cl.
    *G06F 16/487*        (2019.01)
    *G06T 9/00*          (2006.01)
    *G06T 17/00*        (2006.01)

(56)             References Cited

FOREIGN PATENT DOCUMENTS

| | | | |
|---|---|---|---|
| CN | 110706248 | A | 1/2020 |
| CN | 111247798 | A | 6/2020 |
| CN | 112334949 | A | 2/2021 |

OTHER PUBLICATIONS

Cohen et al., "Representation and Coding of Large-Scale 3D Dynamic Maps," Optical Engineering and Applications Total 8 pages (Sep. 27, 2016).

\* cited by examiner

S101

Obtain a 3D map descriptor

S102

Perform binarization on a relationship between the 3D map descriptor and at least one preset threshold vector to obtain binary data

S103

Perform quantization on a difference between the 3D map descriptor and the at least one preset threshold vector to obtain quantized data

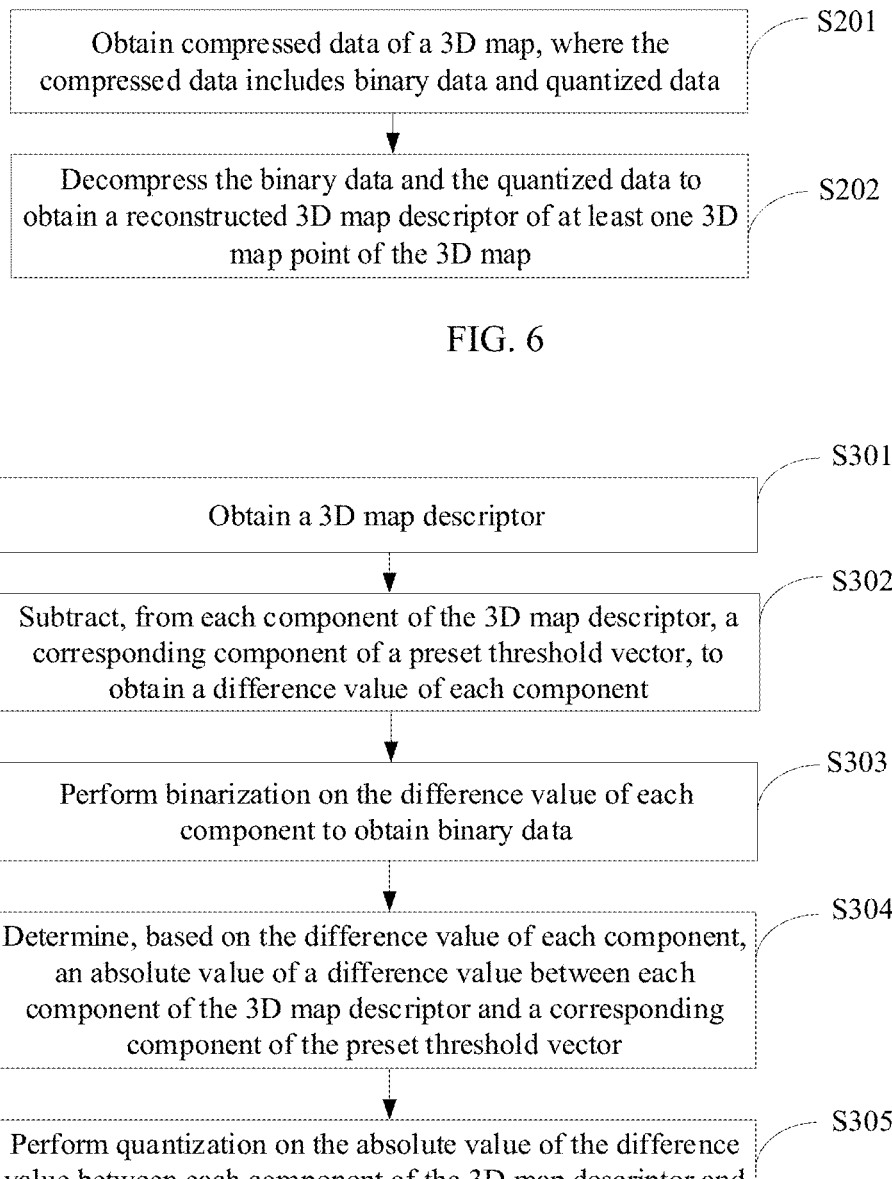

| Obtain compressed data of a 3D map, where the compressed data includes binary data and quantized data | S201 |
| Decompress the binary data and the quantized data to obtain a reconstructed 3D map descriptor of at least one 3D map point of the 3D map | S202 |

FIG. 6

| Obtain a 3D map descriptor | S301 |
| Subtract, from each component of the 3D map descriptor, a corresponding component of a preset threshold vector, to obtain a difference value of each component | S302 |
| Perform binarization on the difference value of each component to obtain binary data | S303 |
| Determine, based on the difference value of each component, an absolute value of a difference value between each component of the 3D map descriptor and a corresponding component of the preset threshold vector | S304 |
| Perform quantization on the absolute value of the difference value between each component of the 3D map descriptor and the corresponding component of the preset threshold vector, to obtain quantized data | S305 |

FIG. 7

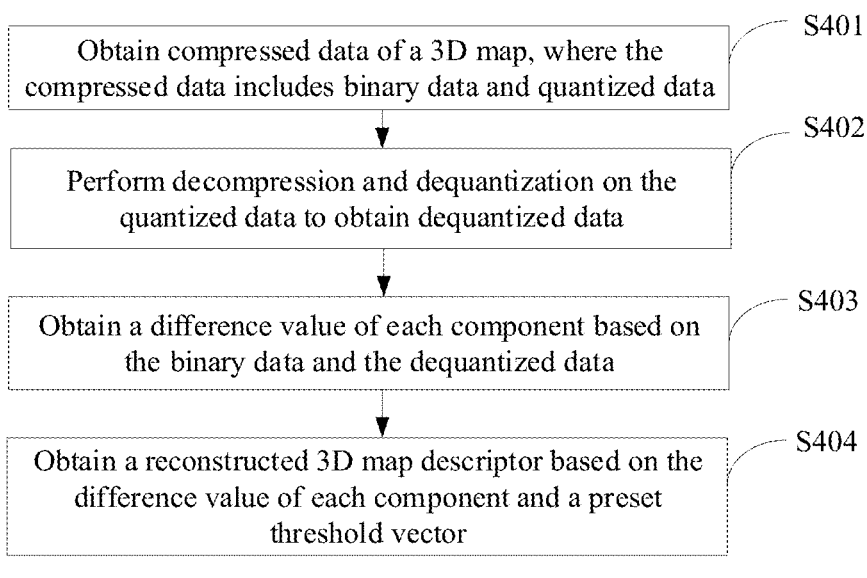

Obtain compressed data of a 3D map, where the
compressed data includes binary data and quantized data ⟋ S401

Perform decompression and dequantization on the
quantized data to obtain dequantized data ⟋ S402

Obtain a difference value of each component based on
the binary data and the dequantized data ⟋ S403

Obtain a reconstructed 3D map descriptor based on the
difference value of each component and a preset
threshold vector ⟋ S404

FIG. 8

Obtain a 3D map descriptor ⟋ S501

Subtract, from each component of the 3D map descriptor,
corresponding components of N preset threshold vectors, to
obtain N difference value vectors, where each difference value
vector includes a difference value of each component ⟋ S502

Perform binarization on the difference value of each component
to obtain binary data ⟋ S503

Determine, based on the difference value of each component,
an absolute value of a difference value between each
component of the 3D map descriptor and a corresponding
component of a target preset threshold vector ⟋ S504

Perform quantization on the absolute value of the difference
value between each component of the 3D map descriptor and
the corresponding component of the target preset threshold
vector, to obtain quantized data ⟋ S505

FIG. 9

```
┌─────────────────────────────────────────────┐   ┌─ S601
│ Obtain compressed data of a 3D map, where the │
│ compressed data includes binary data and      │
│ quantized data                                 │
└─────────────────────────────────────────────┘
                      │
                      ▼
┌─────────────────────────────────────────────┐   ┌─ S602
│ Perform dequantization on the quantized data  │
│ to obtain dequantized data                     │
└─────────────────────────────────────────────┘
                      │
                      ▼
┌─────────────────────────────────────────────┐   ┌─ S603
│ Determine a target preset threshold vector    │
│ from N preset threshold vectors based on the   │
│ binary data                                    │
└─────────────────────────────────────────────┘
                      │
                      ▼
┌─────────────────────────────────────────────┐   ┌─ S604
│ Obtain a reconstructed 3D map descriptor based │
│ on the dequantized data and the target preset  │
│ threshold vector                               │
└─────────────────────────────────────────────┘
```

FIG. 10

Encoder end:

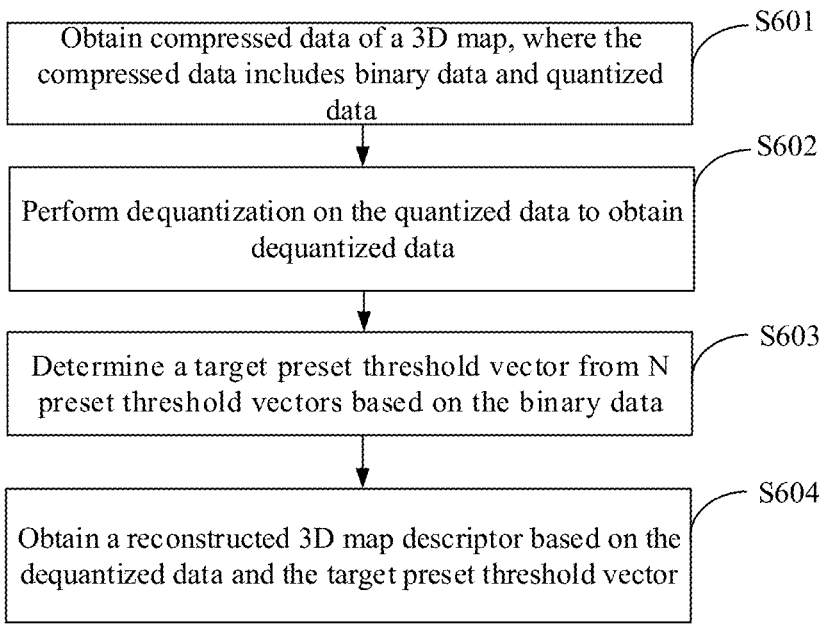

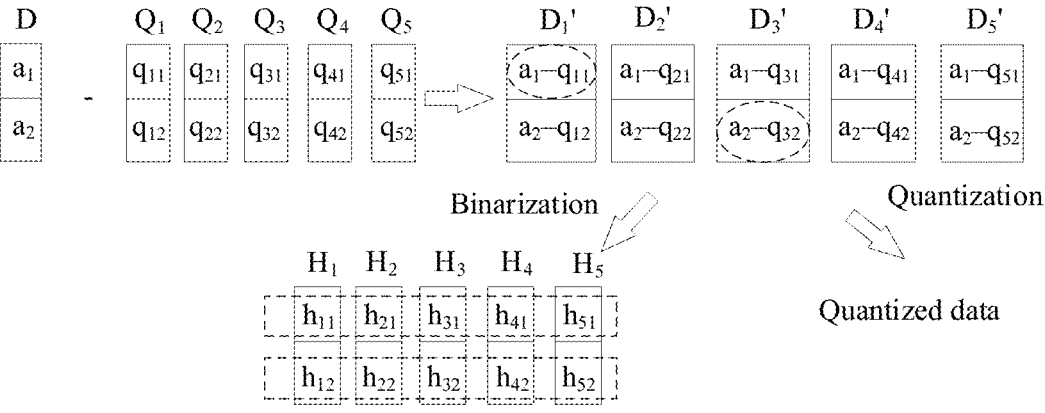

Binarization

Quantization

Quantized data

FIG. 11A

Decoder end:

METHOD AND APPARATUS FOR COMPRESSING AND DECOMPRESSING THREE-DIMENSIONAL (3D) MAP

CROSS-REFERENCE TO RELATED APPLICATIONS

This application is a continuation of International Application No. PCT/CN2021/105623, filed on Jul. 9, 2021, which claims priority to International Application No. PCT/CN2021/098482, filed on Jun. 4, 2021 and International Application No. PCT/CN2021/098483, filed on Jun. 4, 2021. All of the aforementioned patent applications are hereby incorporated by reference in their entireties.

TECHNICAL FIELD

This application relates to three-dimensional (3D) map technologies, and in particular, to methods and apparatuses for compressing and decompressing a 3D map.

BACKGROUND

Virtual reality (VR), augmented reality (AR), and mixed reality (MR) technologies are emerging multimedia virtual scenario technologies in recent years. Such technologies can be used to create virtual reality and overlay it with a real world to produce a new visual environment and interactive experience. In such an application, an electronic device needs to determine pose information of the electronic device in a current environment, to accurately implement fusion between a virtual object and a real scene.

In addition, in applications such as autonomous driving, autonomous navigation, uncrewed aerial vehicle automatic inspection, and industrial robots, a carrying device such as a vehicle, an uncrewed aerial vehicle, or a robot needs to determine a pose of an electronic device carried by the carrying device, to determine a pose of the carrying device in a current environment, so as to perform accurate route planning, navigation, detection, and control.

In the foregoing applications, for a problem that the pose of the electronic device in the current environment needs to be determined, a typical solution is as follows: The electronic device receives, from a server or another device, a three-dimensional (3-dimensional, 3D) map of an environment in which the electronic device is located, collects visual information in the environment by using a local sensor, and determines the current pose of the electronic device based on the collected visual information and the downloaded 3D map.

However, an original 3D map usually includes a large data volume, and map transmission needs to consume a large amount of bandwidth and time, which severely limits application performance and affects user experience.

SUMMARY

This application provides methods and apparatuses for compressing and decompressing a 3D map, to reduce a data volume of a 3D map, thereby reducing storage space required for storing the 3D map or reducing transmission resources required for transmitting the 3D map.

According to a first aspect, an embodiment of this application provides a method for compressing a 3D map. The method may include: obtaining a 3D map descriptor, where the 3D map descriptor corresponds to at least one 3D map point of a 3D map; performing binarization on a relationship between the 3D map descriptor and at least one preset threshold vector to obtain binary data; and performing quantization on a difference between the 3D map descriptor and the at least one preset threshold vector to obtain quantized data.

In this implementation, binarization is performed on the relationship between the 3D map descriptor and the at least one preset threshold vector to obtain the binary data, and quantization is performed on the difference between the 3D map descriptor and the at least one preset threshold vector to obtain the quantized data. A quantity of bits in the binary data and the quantized data is less than a quantity of bits in an original 3D map descriptor, to save storage space and/or transmission resource overheads.

According to the method for compressing a 3D map, a data volume of the 3D map may be reduced, for example, the data volume of the 3D map is reduced from a terabyte (TB) level to a megabyte (GB) level.

The relationship between the 3D map descriptor and the at least one preset threshold vector may include but is not limited to: a magnitude relationship between each component of the 3D map descriptor and a corresponding component of the at least one preset threshold vector. Binarization is performed on the magnitude relationship between each component of the 3D map descriptor and the corresponding component of the at least one preset threshold vector, to obtain binary data, so that a decompressor end may obtain a part of information of the 3D map descriptor based on the binary data and the at least one preset threshold vector. The partial information may be the magnitude relationship between each component and the corresponding component of the at least one preset threshold vector, so that a reconstructed 3D map descriptor is obtained with reference to the quantized data.

The difference between the 3D map descriptor and the at least one preset threshold vector may include but is not limited to: a difference value between or an absolute value of a difference value between each component of the 3D map descriptor and a corresponding component of the at least one preset threshold vector. Quantization is performed on the difference value between or the absolute value of the difference value between each component of the 3D map descriptor and the corresponding component of the at least one preset threshold vector, to obtain the quantized data, so that the decompressor end may obtain another part of information of the 3D map descriptor based on the quantized data and the at least one preset threshold vector. The another part of information may be the difference value between or the absolute value of the difference value between each component and the corresponding component of the at least one preset threshold vector, so that the reconstructed 3D map descriptor is obtained with reference to the binary data.

In a possible design, the binary data and the quantized data may be stored as compressed data of the 3D map into a storage module, or other compression such as prediction may be performed on the binary data and the quantized data to obtain compressed data of the 3D map and the compressed data of the 3D map is stored into the storage module to save storage space.

In a possible design, the method may further include: encapsulating the binary data and the quantized data to obtain a bitstream of a 3D map. The binary data and the quantized data may be encapsulated into the bitstream, to facilitate transmission and save transmission resources.

In a possible design, the method may further include: receiving 3D map request information sent by an electronic device, and sending, to the electronic device in response to the 3D map request information, the bitstream of the 3D map corresponding to the 3D map request information. For example, in an application scenario, the compression method in this embodiment of this application is performed by a server, and the server compresses the 3D map descriptor by using the method for compressing a 3D map in this embodiment of this application, to obtain the bitstream of the 3D map. The server may receive the 3D map request information sent by the electronic device, and the server sends, to the electronic device in response to the 3D map request information, the bitstream of the 3D map corresponding to the 3D map request information. In another application scenario, the compression method in this embodiment of this application is performed by a first electronic device, and a server compresses the 3D map descriptor by using the method for compressing a 3D map in this embodiment of this application, to obtain the bitstream of the 3D map. The first electronic device may receive the 3D map request information sent by a second electronic device, and the first electronic device sends, to the second electronic device in response to the 3D map request information, the bitstream of the 3D map corresponding to the 3D map request information.

In a possible design, the method may further include: sending the bitstream of the 3D map to a server. For example, in an application scenario, the compression method in this embodiment of this application is performed by a first electronic device, and the first electronic device compresses the 3D map descriptor by using the method for compressing a 3D map in this embodiment of this application, to obtain the bitstream of the 3D map. The first electronic device sends the bitstream of the 3D map to the server. In another application scenario, the first electronic device compresses the 3D map descriptor by using the method for compressing a 3D map in this embodiment of this application, to obtain the bitstream of the 3D map. The first electronic device sends the bitstream of the 3D map to the server. The server may receive the 3D map request information sent by a second electronic device, and the server sends, to the second electronic device in response to the 3D map request information, the bitstream of the 3D map corresponding to the 3D map request information.

The method for compressing a 3D map in this embodiment of this application is applicable to any one of the foregoing application scenarios. In different application scenarios, use performance of a corresponding device can be improved, to improve user experience. For example, the server may quickly transmit the bitstream of the 3D map to the electronic device, and the electronic device may use the 3D map to provide a user with an application function related to the 3D map, for example, an AR application.

In a possible design, the method may further include: subtracting, from each component of the 3D map descriptor, a corresponding component of the at least one preset threshold vector, to obtain a difference value of each component; and determining the magnitude relationship based on the difference value of each component.

In a possible design, one preset threshold vector is used for the binarization, and the same preset threshold vector is used for the quantization.

In a possible design, a plurality of preset threshold vectors are used for the binarization, and at least one component of the at least one preset threshold vector used for the quantization is any one of corresponding components of the plurality of preset threshold vectors used for the binarization. For example, three preset threshold vectors are used for the binarization. One component of the 3D map descriptor is used as an example. One of three difference values or absolute values of three difference values may be selected for the quantization. The three difference values or the absolute values of the three difference values are difference values between or absolute values of difference values between one component of the 3D map descriptor and corresponding components of the three preset threshold vectors.

In a possible design, one preset threshold vector in the at least one preset threshold vector used for the binarization is a minimum threshold vector or a maximum threshold vector, each component of the minimum threshold vector is less than or equal to a minimum value of a value range of a corresponding component of the 3D map descriptor, and each component of the maximum threshold vector is greater than or equal to a maximum value of a value range of a corresponding component of the 3D map descriptor.

In this implementation, the minimum threshold vector or the maximum threshold vector may ensure that at least one of difference values between components of the 3D map descriptor and corresponding components of the at least one preset threshold vector is greater than or equal to 0. A difference value between rather than an absolute value of a difference value between a component of the 3D map descriptor and a corresponding component of the at least one preset threshold vector may be used during subsequent quantization, to reduce calculation complexity.

In a possible design, when the at least one preset threshold vector used for the binarization includes N preset threshold vectors, components at a same position of the N preset threshold vectors successively increase or decrease, where N is an integer greater than 1. Successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, where $2 \le i \le N$.

In this implementation, because the components at the same position of the N preset threshold vectors successively increase or decrease, a value of each component may be divided into N+1 or N intervals by using the N preset threshold vectors, so that different intervals to which the components of the 3D map descriptor belong are indicated by different binary data. Therefore, the binary data carries a part of information of the 3D map descriptor, so that the decompressor end obtains the reconstructed the 3D map descriptor.

For example, the binary data may include multi-bit binary data corresponding to each of components of the 3D map descriptor, and multi-bit binary data corresponding to any component of the components indicates an interval to which the corresponding component belongs, and further indicates a component of a preset threshold vector corresponding to the component in the quantization. For example, if multi-bit binary data corresponding to any component is 1100, a preset threshold vector corresponding to the component in the quantization is F2, that is, the component is a component in F2 at a same position as the component. A correspondence between 1100 and F2 may be preset.

In a possible design, the binary data includes multi-bit binary data corresponding to each of components of the 3D map descriptor, and a quantity of values 1 or 0 in multi-bit binary data corresponding to any component of the components indicates a component of a preset threshold vector corresponding to the component.

In this implementation, a quantity of values 1 or 0 in multi-bit binary data corresponding to any component of the components indicates a component of a preset threshold vector corresponding to the component, so that the decompressor end obtains the reconstructed 3D map descriptor.

For example, a 3D map descriptor D is (0.35, 0.45). Four preset threshold vectors are F1: (0.2, 0.3), F2: (0.3, 0.35), F3: (0.4, 0.45), and F4: (0.5, 0.5), respectively. Components at a same position of the four preset threshold vectors successively increase. Binarization is performed on a relationship between the 3D map descriptor and four preset threshold vectors to obtain H1: (1, 1), H2: (1, 1), H3: (0, 1), H4: (0, 0), and binary data is 11001110. A vector used for quantizing D is (0.3, 0.45), that is, a component (0.3) in F2 and a component (0.45) in F3.

In a possible design, the at least one preset threshold vector used for the quantization is the same as the at least one preset threshold vector indicated by the binary data for quantization.

In a possible design, the at least one component of the at least one preset threshold vector used for the quantization is obtained based on the binary data. For example, binarization may be first performed on the 3D map descriptor, and then quantization is performed based on the binary data.

In a possible design, at least one bit in the binary data further indicates a quantity of bits in the quantized data.

Different binary data may indicate different intervals to which components of the 3D map descriptor belong, lengths of different intervals may be different, lengths of different intervals may correspond to different quantities of bits in quantized data, and different quantities of bits in quantized data correspond to different quantization precision. The quantity of bits in the quantized data is dynamically indicated by the binary data, so that the decompressor end correctly decompresses the quantized data.

According to a second aspect, an embodiment of this application provides a method for decompressing a 3D map. The method may include: obtaining compressed data of a 3D map, where the compressed data includes binary data and quantized data; and obtaining a reconstructed 3D map descriptor based on the binary data and the quantized data.

In a possible design, the obtaining compressed data of a 3D map may include: obtaining a bitstream of the 3D map; and decapsulating the bitstream of the 3D map to obtain the compressed data of the 3D map.

In a possible design, the method may further include: sending 3D map request information, and receiving the bitstream of the 3D map corresponding to the 3D map request information; or receiving the bitstream of the 3D map.

In a possible design, the obtaining a reconstructed 3D map descriptor based on the binary data and the quantized data may include: performing dequantization on the quantized data to obtain a difference between the reconstructed 3D map descriptor and at least one preset threshold vector; and obtaining the reconstructed 3D map descriptor based on the difference, the binary data, and the at least one preset threshold vector, where the binary data indicates a relationship between the reconstructed 3D map descriptor and the at least one preset threshold vector.

In a possible design, the relationship between the reconstructed 3D map descriptor and the at least one preset threshold vector may include: a magnitude relationship between each component of the reconstructed 3D map descriptor and a corresponding component of the at least one preset threshold vector.

In a possible design, the difference between the reconstructed 3D map descriptor and the at least one preset threshold vector includes: a difference value between or an absolute value of a difference value between each component of the reconstructed 3D map descriptor and a corresponding component of the at least one preset threshold vector.

In a possible design, the binary data further indicates the at least one preset threshold vector, and the method may further include: determining the at least one preset threshold vector based on the binary data and N preset threshold vectors. Components at a same position of the N preset threshold vectors successively increase or decrease, where N is an integer greater than 1. Successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, where $2 \le i \le N$.

In a possible design, the binary data includes multi-bit binary data corresponding to each of components of the reconstructed 3D map descriptor, and a quantity of values 1 or 0 in multi-bit binary data corresponding to any component of the components indicates a preset threshold vector corresponding to the component.

In a possible design, at least one bit in the binary data further indicates a quantity of bits in the quantized data.

According to a third aspect, an embodiment of this application provides an apparatus for compressing a 3D map. The apparatus may be a chip or a system-on-chip in an electronic device or a server, or may be a functional module that is in the electronic device or the server and that is configured to implement the method according to the first aspect or any possible implementation of the first aspect. For example, the apparatus for compressing a 3D map may include a binarization module, configured to obtain a 3D map descriptor, where the 3D map descriptor corresponds to at least one 3D map point of a 3D map, where the binarization module is further configured to perform binarization on a relationship between the 3D map descriptor and at least one preset threshold vector to obtain binary data; and a quantization module, configured to perform quantization on a difference between the 3D map descriptor and the at least one preset threshold vector to obtain quantized data.

In a possible design, the apparatus may further include an encapsulation module, configured to encapsulate the binary data and the quantized data to obtain a bitstream of the 3D map.

In a possible design, the apparatus may further include: a transmission module, configured to receive 3D map request information sent by an electronic device, and send, to the electronic device in response to the 3D map request information, the bitstream of the 3D map corresponding to the 3D map request information; or a transmission module, configured to send the bitstream of the 3D map to a server.

In a possible design, the relationship between the 3D map descriptor and the at least one preset threshold vector includes a magnitude relationship between each component of the 3D map descriptor and a corresponding component of the at least one preset threshold vector.

In a possible design, the difference between the 3D map descriptor and the at least one preset threshold vector includes: a difference value between or an absolute value of a difference value between each component of the 3D map descriptor and a corresponding component of the at least one preset threshold vector.

In a possible design, the binarization module is further configured to: subtract, from each component of the 3D map descriptor, a corresponding component of the at least one preset threshold vector, to obtain a difference value of each component; and determine the magnitude relationship based on the difference value of each component.

In a possible design, at least one component of the at least one preset threshold vector used for the quantization is any one of corresponding components of the at least one preset threshold vector used for the binarization.

In a possible design, one preset threshold vector in the at least one preset threshold vector used for the binarization is a minimum threshold vector or a maximum threshold vector, each component of the minimum threshold vector is less than or equal to a minimum value of a value range of a corresponding component of the 3D map descriptor, and each component of the maximum threshold vector is greater than or equal to a maximum value of a value range of a corresponding component of the 3D map descriptor.

In a possible design, when the at least one preset threshold vector used for the binarization includes N preset threshold vectors, components at a same position of the N preset threshold vectors successively increase or decrease, where N is an integer greater than 1; and successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, where $2 \leq i \leq N$.

In a possible design, the binary data includes multi-bit binary data corresponding to each of components of the 3D map descriptor, and a quantity of values 1 or 0 in multi-bit binary data corresponding to any component of the components indicates a component of a preset threshold vector corresponding to the component.

In a possible design, the at least one preset threshold vector used for the quantization is the same as the at least one preset threshold vector indicated by the binary data for quantization.

In a possible design, the at least one component of the at least one preset threshold vector used for the quantization is obtained based on the binary data.

In a possible design, at least one bit in the binary data further indicates a quantity of bits in the quantized data.

According to a fourth aspect, an embodiment of this application provides an apparatus for decompressing a 3D map. The apparatus may be a chip or a system-on-chip in an electronic device or a server, or may be a functional module that is in the electronic device or the server and that is configured to implement the method according to the second aspect or any possible implementation of the second aspect. For example, the apparatus for decompressing a 3D map includes a reconstruction module, configured to obtain compressed data of a 3D map by using a storage module or a transmission module, where the compressed data includes binary data and quantized data. The reconstruction module is further configured to obtain a reconstructed 3D map descriptor based on the binary data and the quantized data.

In a possible design, the reconstruction module is configured to: obtain a bitstream of the 3D map by using the transmission module, and decapsulate the bitstream of the 3D map to obtain the compressed data of the 3D map.

In a possible design, the transmission module is configured to: send 3D map request information, and receive the bitstream of the 3D map corresponding to the 3D map request information; or the transmission module is configured to receive the bitstream of the 3D map.

In a possible design, the reconstruction module is configured to: perform dequantization on the quantized data to obtain a difference between the reconstructed 3D map descriptor and at least one preset threshold vector; and obtain the reconstructed 3D map descriptor based on the difference, the binary data, and the at least one preset threshold vector, where the binary data indicates a relationship between the reconstructed 3D map descriptor and the at least one preset threshold vector.

In a possible design, the relationship between the reconstructed 3D map descriptor and the at least one preset threshold vector includes: a magnitude relationship between each component of the reconstructed 3D map descriptor and a corresponding component of the at least one preset threshold vector.

In a possible design, the difference between the reconstructed 3D map descriptor and the at least one preset threshold vector includes: a difference value between or an absolute value of a difference value between each component of the reconstructed 3D map descriptor and a corresponding component of the at least one preset threshold vector.

In a possible design, the binary data further indicates the at least one preset threshold vector, and the reconstruction module is further configured to: determine the at least one preset threshold vector based on the binary data and N preset threshold vectors. Components at a same position of the N preset threshold vectors successively increase or decrease, where N is an integer greater than 1; and successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, where $2 \leq i \leq N$.

In a possible design, the binary data includes multi-bit binary data corresponding to each of components of the reconstructed 3D map descriptor, and a quantity of values 1 or 0 in multi-bit binary data corresponding to any component of the components indicates a component of a preset threshold vector corresponding to the component.

In a possible design, at least one bit in the binary data further indicates a quantity of bits in the quantized data.

According to a fifth aspect, an embodiment of this application provides an apparatus for compressing a 3D map, including: one or more processors; and a memory, configured to store one or more programs. When the one or more programs are executed by the one or more processors, the one or more processors are enabled to implement the method according to any one of the first aspect or the possible designs of the first aspect.

According to a sixth aspect, an embodiment of this application provides an apparatus for decompressing a 3D map, including: one or more processors; and a memory, configured to store one or more programs. When the one or more programs are executed by the one or more processors, the one or more processors are enabled to implement the method according to any one of the second aspect or the possible designs of the second aspect.

According to a seventh aspect, an embodiment of this application provides a computer-readable storage medium, including a computer program. When the computer program is executed on a computer, the computer is enabled to perform the method according to the first aspect or any one of the possible designs of the first aspect, or perform the method according to the second aspect or any one of the possible designs of the second aspect.

According to an eighth aspect, this application provides a computer program or a computer program product. When the computer program or the computer program product is executed on a computer, the computer is enabled to implement the method according to the first aspect or the second aspect or any one of the possible implementations of the first aspect and the second aspect.

It should be understood that the technical solutions in the third to the seventh aspects of this application are consistent with those in the first aspect and the second aspect of this application. Beneficial effects achieved in the aspects and the corresponding feasible implementations are similar thereto, and details are not described again.

BRIEF DESCRIPTION OF DRAWINGS

FIG. 6 is a schematic flowchart of a method for decompressing a 3D map according to an embodiment of this application;

FIG. 7 is a schematic flowchart of a method for compressing a 3D map according to an embodiment of this application;

FIG. 8 is a schematic flowchart of a method for decompressing a 3D map according to an embodiment of this application;

FIG. 9 is a schematic flowchart of a method for compressing a 3D map according to an embodiment of this application;

FIG. 10 is a schematic flowchart of a method for decompressing a 3D map according to an embodiment of this application;

FIG. 11A and FIG. 11B are schematic diagrams of methods for encoding and decoding a 3D map according to an embodiment of this application;

DESCRIPTION OF EMBODIMENTS

Figure 1:
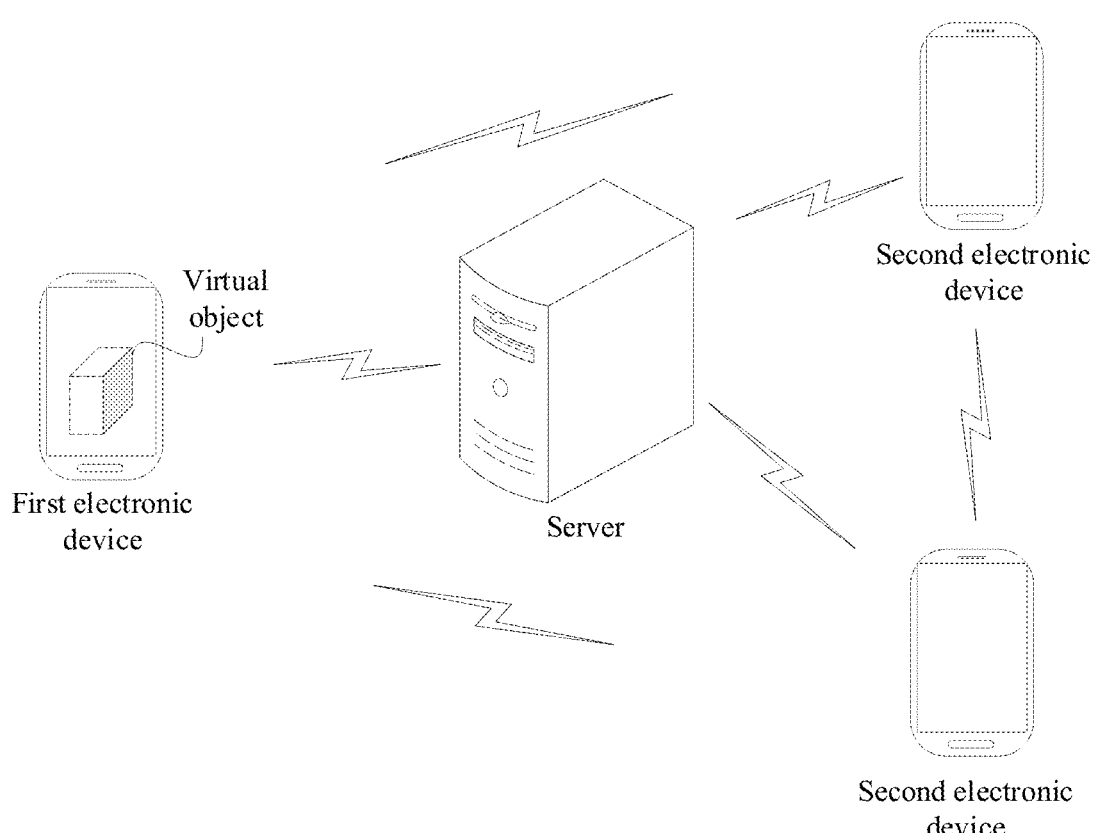
FIG. 1 is a schematic diagram of an application architecture according to an embodiment of this application.

The following describes embodiments of this application with reference to the accompanying drawings in embodiments of this application. Terms used in embodiments of this application are merely used to explain exemplary embodiments of this application, but are not intended to limit this application.

In embodiments of the specification, claims, and the accompanying drawings of this application, the terms "first", "second", and the like are merely intended for distinguishing and description, and shall not be understood as an indication or implication of relative importance or an indication or implication of an order. In addition, the terms "include", "have", and any variant thereof are intended to cover non-exclusive inclusion, for example, inclusion of a series of steps or units. A method, a system, a product, or a device is not necessarily limited to clearly listed steps or units, but may include other steps or units that are not clearly listed and that are inherent to the process, the method, the product, or the device.

It should be understood that, in this application, "at least one (item)" is one or more, and "a plurality of" is two or more. The term "and/or" describes an association relationship of associated objects, and indicates that three relationships may exist. For example, "A and/or B" may indicate the following three cases: Only A exists, only B exists, and both A and B exist. A and B may be singular or plural. The character "/" usually indicates an "or" relationship between associated objects. "At least one of the following items" or a similar expression thereto indicates any combination of the items, including one of the items or any combination of a plurality of the items. For example, at least one of a, b, or c may indicate a, b, c, a and b, a and c, b and c, or a, b, and c, where a, b, and c may be singular or plural.

In embodiments of this application, the term such as "example" or "for example" is used to represent giving an example, an illustration, or a description. Any embodiment or design described by "example" or "for example" in embodiments of this application shall not be construed as being more preferred or advantageous than another embodiment or design. To be precise, the term such as "example" or "for example" is intended to present a relative concept in a specific manner.

The terms "a", "said", and "the" in singular forms used in embodiments and the appended claims of this application are also intended to include plural forms, unless otherwise specified in the context clearly. It should be further understood that, the term "and/or" used herein indicates and includes any or all possible combinations of one or more associated listed items. As used herein, the meaning of "a", "some", and "the" in singular forms also includes plural forms, unless otherwise expressly indicated in the context. It should be further understood that the terms "include", "have", "comprise", and/or "include" are used in this specification to specify the existence of the stated features, integers, steps, operations, elements, and/or components, but do not exclude the existence or addition of one or more other features, integers, steps, operations, elements, components, and/or groups thereof.

It should be noted that the terms used in embodiments of this application are merely for the purpose of illustrating exemplary embodiments, and are not intended to limit this application.

FIG. 1 is a schematic diagram of an application architecture according to an embodiment of this application. As shown in FIG. 1, the application architecture includes a plurality of electronic devices and a server. The plurality of electronic devices may include a first electronic device and one or more second electronic devices (two second electronic devices are used as an example in FIG. 1). The one or more second electronic devices are several electronic devices other than the first electronic device. Communication may be performed between the plurality of electronic devices and the server and between the plurality of electronic devices. For example, any device in the application architecture may communicate with another device in a manner such as wireless fidelity (Wi-Fi) communication, Bluetooth communication, or cellular 2nd/3rd/4th/5th generation (2G/3G/4G/5G) communication. It should be understood that another communication manner, including a future communication manner, may be further used between the server and the electronic device. This is not specifically limited herein. It should be noted that "one or more second electronic devices" in this embodiment of this application is merely used to represent an electronic device other than the first electronic device, but whether types of the plurality of electronic devices are the same is not limited.

The electronic devices may be various types of devices provided with cameras and display components. For example, the electronic device may be a terminal device such as a mobile phone, a tablet computer, a notebook computer, or a video recorder (a mobile phone is used as an example of the electronic device in FIG. 1). Alternatively, the electronic device may be a device used for interaction in a virtual scenario, including VR glasses, an AR device, an MR interaction device, or the like. Alternatively, the electronic device may be a wearable electronic device such as a smartwatch or a smart band. Alternatively, the electronic device may be a device carried in a carrying device such as a vehicle, an uncrewed vehicle, an uncrewed aerial vehicle, or an industrial robot. A specific form of the electronic device is not specially limited in embodiments of this application.

In addition, the electronic device may also be referred to as user equipment (UE), a subscriber station, a mobile unit, a subscriber unit, a wireless unit, a remote unit, a mobile device, a wireless device, a wireless communication device, a remote device, a mobile subscriber station, a terminal device, an access terminal, a mobile terminal, a wireless terminal, a smart terminal, a remote terminal, a handheld terminal, a user agent, a mobile client, a client, or another proper term.

The server may be one or more physical servers (one physical server is used as an example in FIG. 1), or may be a computer cluster, or may be a virtual machine or a cloud server in a cloud computing scenario, or the like.

In this embodiment of this application, a virtual scenario application (APP) such as a VR application, an AR application, or an MR application may be installed on the electronic device, and the VR application, the AR application, or the MR application may be run based on a user operation (for example, tap, touch, slide, shake, or voice control). The electronic device may collect visual information of any object in an environment by using a sensor, and then display a virtual object on a display component based on the collected visual information. The virtual object may be a virtual object (namely, an object in a virtual environment) in a VR scenario, an AR scenario, or an MR scenario.

In this embodiment of this application, a navigation, detection, or control application may be installed on the electronic device, and a corresponding application is run based on operations and control of a user or a preset program. The electronic device may run applications such as route planning, object detection, and carrying device operations and control based on a pose and other status information of the electronic device in a current environment.

The pose is location and orientation information of the electronic device, and may be an absolute pose in the world coordinate system, or may be a relative pose relative to a point in an environment.

The visual information in embodiments of this application includes but is not limited to an image video (without depth information) collected by a camera, an image video (with depth information) collected by a depth sensor, data collected by a lidar (LiDAR), and data collected by a millimeter-wave radar (RaDAR).

It should be noted that, in this embodiment of this application, the virtual scenario application in the electronic device may be an application built in the electronic device, or may be an application that is provided by a third-party service provider and that is installed by the user. This is not specifically limited herein.

In this embodiment of this application, a simultaneous localization and mapping (SLAM) system may be further configured for the electronic device. The SLAM system can create a map in a completely unknown environment, and use the map to perform positioning, pose (location and posture) determining, navigation, and the like. In this embodiment of this application, a map created by the SLAM system is referred to as a SLAM map. The SLAM map may be understood as a map drawn by the SLAM system based on environment information collected by a collection device. The collection device may include a visual information collection apparatus and an inertia measurement unit (IMU) in the electronic device. The visual information collection apparatus may include, for example, a camera, a depth camera, a lidar, and a millimeter-wave radar. The IMU may include, for example, a sensor such as a gyroscope and an accelerometer.

In embodiments of this application, the SLAM map is also referred to as a 3D map. It should be noted that the 3D map includes but is not limited to a SLAM map, and may further include a three-dimensional map created by using another technology. This is not specifically limited in embodiments of this application.

In a possible implementation, the 3D map may include a plurality of 3D map points, and correspondingly, data of the 3D map may include data of the plurality of 3D map points. The 3D map point is a point of interest or a point having a significant feature in an environment.

A possible manner of obtaining a 3D map point is to use a plurality of devices such as a lidar, an aerial photography (tilt photography) from an angle of view of an uncrewed aerial vehicle, a high-definition panoramic camera, a high-definition industrial camera to perform shooting, and extract a 3D map point, from data obtained through shooting by the foregoing devices, by using a method such as ORB, scale-invariant feature transform (SIFT), speeded up robust features (SURF), binary robust independent elementary features (BRIEF), a binary robust invariant scalable key point (BRISK), a fast retina keypoint (FREAK), D2Net, or a self-supervised training feature point detection and descriptor extraction method (SuperPoint).

Data of a 3D map point may include the following.

(1) 3D Map Point Descriptor

The 3D map point descriptor is a vector, used to represent a local feature of a corresponding 3D map point. In a visual positioning algorithm, a 3D map point descriptor is used for matching between 3D map points. A possible method is: calculating a distance (which may be a Euclidean distance, an inner product distance, a Hamming distance, or the like) between two 3D map point descriptors; and when the distance is less than a threshold, considering that the two 3D map points match.

(2) 3D Map Point Spatial Location

A 3D map point spatial location may be represented by using X, Y, and Z on three-dimensional spatial axes, or may be represented by using a longitude, a latitude, and an altitude, or may be represented by using polar coordinates or the like. A method for representing a 3D map point spatial location is not specifically limited in embodiments of this application. The 3D map point spatial location may be an absolute location of a 3D map point or a relative location of a 3D map point. For example, a central location of an entire area is used as an origin, and all 3D map point spatial locations are offset locations relative to a spatial location of the origin.

In embodiments of this application, a number may be allocated to each 3D map point and written into data of the 3D map, or a storage sequence of a plurality of 3D map points in a memory may be used to implicitly indicate numbers of the 3D map points. It should be noted that the sequence of the plurality of 3D map points included in the 3D map is meaningless. Therefore, the foregoing numbers may be considered as identifiers used to identify the 3D map points, to distinguish between the 3D map points. However, the numbers are not intended to limit the sequence of the plurality of 3D map points. For example, a 3D map includes three 3D map points whose numbers are respectively 1, 2, and 3, and the three 3D map points may be processed in an order of 1, 2, and 3, or in an order of 3, 2, and 1, or in an order of 2, 1, and 3, or the like.

In a possible implementation, the data of the 3D map further includes a plurality of area descriptors, and any one of the plurality of area descriptors describes features of some or all 3D map points of the plurality of 3D map points. To be specific, for any one of the plurality of area descriptors, the area descriptor may describe features of some or all 3D map points of the plurality of 3D map points. In this case, the area descriptor and the 3D map point are in a one-to-many relationship. A feature of each 3D map point of the plurality of 3D map points may be described by some or all area descriptors of the plurality of area descriptors. In this case, the 3D map point and the area descriptor are in a one-to-many relationship. It can be learned that a plurality of area descriptors and a plurality of 3D map points are in a many-to-many relationship. A method for generating an area descriptor includes but is not limited to a conventional method such as a BOW and a vector of locally aggregated descriptors (VLAD), and a novel method based on NetV-LAD or artificial intelligence (AI). Similarly, a plurality of area descriptors may be identified by numbers to distinguish between the plurality of area descriptors. Similarly, however, the numbers are not intended to limit a sequence of the plurality of area descriptors.

In a possible implementation, the data of the 3D map further includes a correspondence between a 3D map point and a descriptor. The correspondence clearly describes which 3D map points any descriptor corresponds to and which descriptors any 3D map point corresponds to.

Optionally, the foregoing correspondence may be explicitly described by using a correspondence table between a number of an area descriptor and a number of a 3D map point. For example, the 3D map includes three area descriptors whose numbers are T1 to T3, and five 3D map points. Numbers of six 3D map point spatial locations are P1 to P6, and numbers of six 3D map point descriptors are F1 to F6. The correspondence table is shown in Table 1.

TABLE 1

| Area descriptor | 3D map point spatial location | 3D map point descriptor |
|---|---|---|
| T1 | $P_1$ | $F_1$ |
| | $P_2$ | $F_2$ |
| | $P_3$ | $F_3$ |
| T2 | $P_2$ | $F_2$ |
| | $P_3$ | $F_3$ |
| T3 | $P_3$ | $F_3$ |
| | $P_4$ | $F_4$ |
| | $P_5$ | $F_5$ |
| | $P_6$ | $F_6$ |

It should be noted that, Table 1 is an example of a correspondence table between a number of an area descriptor and a number of a 3D map point. The correspondence table may alternatively be presented in another format or manner. This is not specifically limited in this application.

Optionally, the foregoing correspondence may alternatively be implicitly described by using storage locations of an area descriptor and a 3D map point. For example, T1 is first stored in the memory, and then data of P1, P2, and P3 is stored; then T2 is stored, and then data of P2 and P3 is stored; and finally, T3 is stored, and then data of P3, P4, P5, and P6 is stored.

Figure 2:
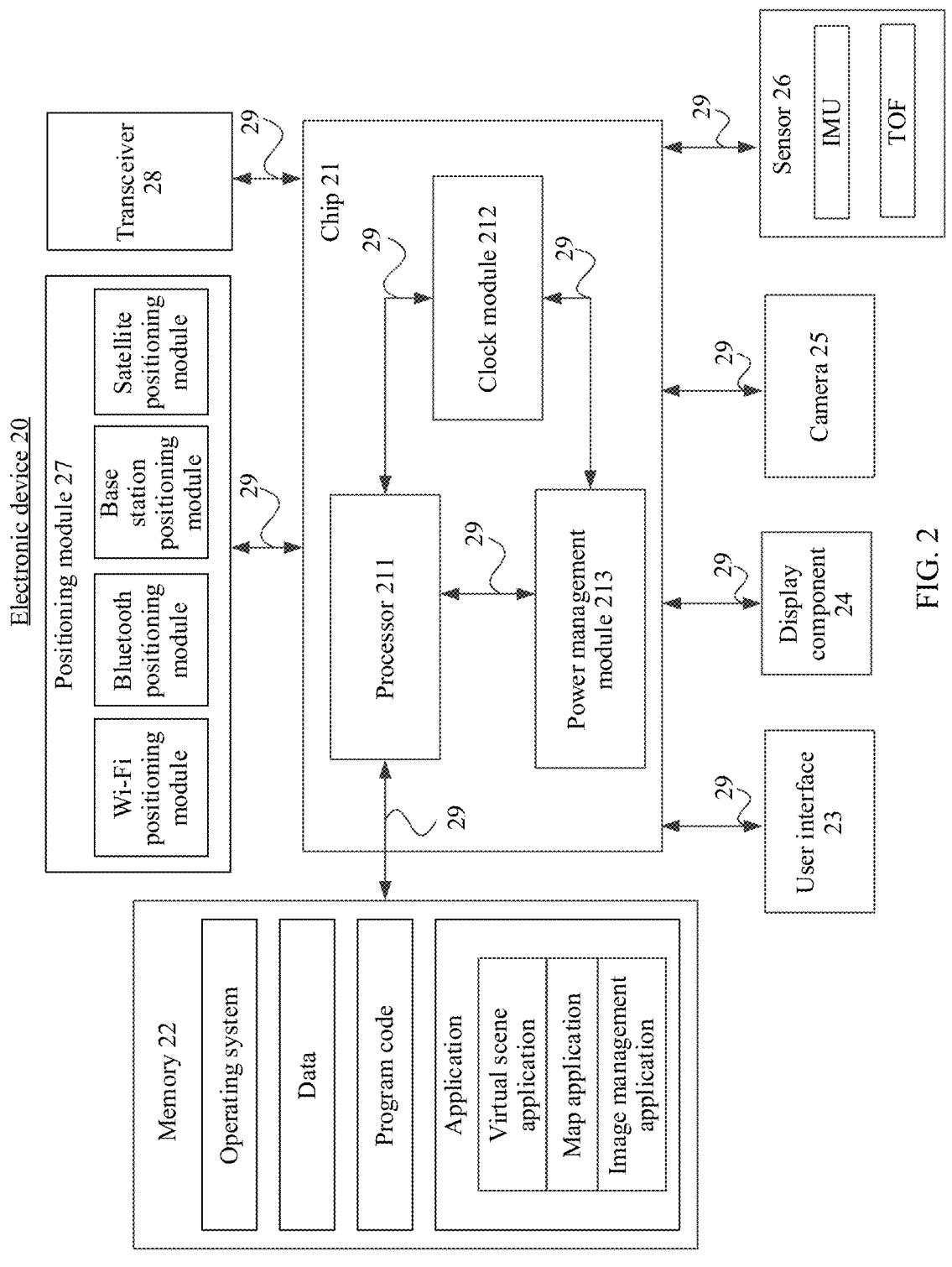
FIG. 2 is a schematic diagram of a structure of an electronic device 20 according to an embodiment of this application.

FIG. 2 is a schematic diagram of a structure of an electronic device 20 according to an embodiment of this application. As shown in FIG. 2, the electronic device 20 may be at least one of the first electronic device and one or more second electronic devices in the embodiment shown in FIG. 1. It should be understood that the structure shown in FIG. 2 does not constitute a specific limitation on the electronic device 20. In some other embodiments of this application, the electronic device 20 may include more or fewer components than those shown in FIG. 2, or combine some components, or split some components, or have different component arrangements. The components shown in FIG. 2 may be implemented in hardware including one or more signal processing and/or application-specific integrated circuits, software, or a combination of hardware and software.

The electronic device 20 may include a chip 21, a memory 22 (one or more computer-readable storage media), a user interface 23, a display component 24, a camera 25, a sensor 26, a positioning module 27 configured to perform device positioning, and a transceiver 28 configured to perform communication. These components may communicate with each other through one or more buses 29.

One or more processors 211, a clock module 212, and a power management module 213 may be integrated into the chip 21. The clock module 212 integrated in the chip 21 is mainly configured to provide a timer required for data transmission and timing control for the processor 211. The timer may implement clock functions of data transmission and timing control. The processor 211 may execute an operation and generate an operation control signal based on an instruction operation code and a timing signal, to complete control of instruction fetching and instruction execution. The power management module 213 integrated in the chip 21 is mainly configured to provide a stable and high-precision voltage for the chip 21 and another component of the electronic device 20.

The processor 211 may also be referred to as a central processing unit (CPU). The processor 211 may include one or more processing units. For example, the processor 211 may include an application processor (AP), a modem processor, a graphics processing unit (GPU), an image signal processor (ISP), a controller, a video codec, a digital signal processor (DSP), a baseband processor, a neural processing unit (NPU), and/or the like. Different processing units may be independent components, or may be integrated into one or more processors.

In a possible implementation, the processor 211 may include one or more interfaces. The interface may include an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, a universal serial bus (USB) port, and/or the like.

The memory 22 may be connected to the processor 211 through the bus 29, or may be coupled to the processor 311, and is configured to store various software programs and/or a plurality of groups of instructions. The memory 22 may include a high-speed random access memory (for example, a cache), or may include a nonvolatile memory, for example, one or more magnetic disk storage devices, a flash memory device, or another nonvolatile solid-state storage device. The memory 22 may store an operating system, for example, an embedded operating system such as Android, Apple (iOS), Microsoft (Windows), or Linux. The memory 22 may further store data, for example, image data, point cloud data, 3D map data, pose data, coordinate system conversion information, and map update information. The memory 22 may further store computer-executable program code. The computer-executable program code includes instructions, for example, communication program instructions and related program instructions of a SLAM system. The memory 22 may further store one or more applications, for example, a virtual scenario application such as AR/VR/MR, a map application, an image management application, and a navigation and control application. The memory 22 may further store a user interface program. The user interface program may vividly display content of an application, for example, a virtual object in a virtual scenario such as AR/VR/MR, by using a graphical operation interface, present the content by using the display component 24, and receive a control operation performed by a user on the application by using an input control such as a menu, a dialog box, or a button.

The user interface 23 may be, for example, a touch panel. The touch panel may detect an instruction of an operation performed by the user on the touch panel. The user interface 23 may be, for example, a keypad, a physical button, or a mouse.

The electronic device 20 may include one or more display components 24. The electronic device 20 may implement a display function jointly by using the display component 24, a graphics processing unit (GPU) and an application processor (AP) in the chip 21, and the like. The GPU is a microprocessor for implementing image processing, and is connected to the display component 24 and the application processor. The GPU performs mathematical and geometric calculation for graphics rendering. The display component 24 may display interface content output by the electronic device 20, for example, display an image, a video, and the like in a virtual scenario such as AR/VR/MR. The interface content may include an interface of a running application, a system-level menu, and the like, and may include the following interface elements: input interface elements, such as a button (Button), a text input box (Text), a scrollbar (Scrollbar), and a menu (Menu); and output interface elements, such as a window (Window), a label (Label), an image, a video, and an animation.

The display component 24 may be a display panel, a lens (for example, VR glasses), a projection screen, or the like. The display panel may also be referred to as a display screen, for example, may be a touchscreen, a flexible screen, a curved screen, or the like, or may be another optical component. It should be understood that the display screen of the electronic device in embodiments of this application may be a touchscreen, a flexible screen, a curved screen, or a screen in another form. In other words, the display screen of the electronic device has a function of displaying an image, and a specific material and shape of the display screen are not specifically limited.

For example, when the display component 24 includes a display panel, the display panel may use a liquid crystal display (LCD), an organic light-emitting diode (OLED), an active matrix organic light-emitting diode or an active-matrix organic light-emitting diode (AMOLED), a flexible light-emitting diode (FLED), a MiniLed, a MicroLed, a Micro-oLed, a quantum dot light-emitting diode (QLED), or the like. In addition, in a possible implementation, the touch panel in the user interface 23 may be coupled to the display panel in the display component 24. For example, the touch panel may be disposed below the display panel, the touch panel is configured to detect touch pressure that acts on the display panel when the user enters a touch operation (for example, tap, slide, or touch) by using the display panel, and the display panel is configured to display content.

The camera 25 may be a monocular camera, a binocular camera, or a depth camera, and is configured to photograph/record an environment to obtain an image/video image. The image/video image collected by the camera 25 may be, for example, used as input data of the SLAM system, or an image/video may be displayed by using the display component 24.

In a possible implementation, the camera 25 may also be considered as a sensor. The image collected by the camera 25 may be in an IMG format, or may be in another format type. This is not specifically limited in embodiments of this application.

The sensor 26 may be configured to collect data related to a status change (for example, rotation, swing, movement, or jitter) of the electronic device 20. The data collected by the sensor 26 may be used as input data of the SLAM system. The sensor 26 may include one or more sensors, for example, an inertia measurement unit (IMU) and a time of flight (TOF) sensor. The IMU may include sensors such as a gyroscope and an accelerometer. The gyroscope is configured to measure an angular velocity of the electronic device when the electronic device moves, and the accelerometer is configured to measure acceleration of the electronic device when the electronic device moves. The TOF sensor may include an optical transmitter and an optical receiver. The optical transmitter is configured to emit light outward, for example, laser light, an infrared ray, or a radar wave. The optical receiver is configured to detect reflected light, for example, reflected laser light, an infrared ray, or a radar wave.

It should be noted that the sensor 26 may further include more other sensors, such as an inertia sensor, a barometer, a magnetometer, and a wheel speedometer. This is not specifically limited in embodiments of this application.

The positioning module 27 is configured to implement physical positioning of the electronic device 20, for example, configured to obtain an initial location of the electronic device 20. The positioning module 27 may include one or more of a Wi-Fi positioning module, a Bluetooth positioning module, a base station positioning module, and a satellite positioning module. A global navigation satellite system (GNSS) may be disposed in the satellite positioning module to assist in positioning. The GNSS is not limited to a BeiDou system, a Global Positioning System (GPS) system, a global navigation satellite system (GLONASS) system, and a Galileo Navigation Satellite System (Galileo) system.

The transceiver 28 is configured to implement communication between the electronic device 20 and another device (for example, a server or another electronic device). The transceiver 28 integrates a transmitter and a receiver, which are respectively configured to send and receive a radio frequency signal. In an exemplary implementation, the transceiver 28 includes but is not limited to an antenna system, a radio frequency (RF) transceiver, one or more amplifiers, a tuner, one or more oscillators, a digital signal processor, a codec (CODEC) chip, a subscriber identity module (SIM) card, a storage medium, and the like. In a possible implementation, the transceiver 28 may be alternatively implemented on a separate chip. The transceiver 28 supports at least one data network communication in at least one data network of 2G/3G/4G/5G or the like, and/or supports at least one of the following short-range wireless communication manners: Bluetooth (BT) communication, Wireless Fidelity (Wi-Fi) communication, near-field communication (NFC), infrared (IR) wireless communication, ultra-wideband (UWB) communication, and ZigBee protocol communication.

In this embodiment of this application, the processor 211 runs program code stored in the memory 22, to perform various function applications and data processing of the electronic device 20.

Figure 3:
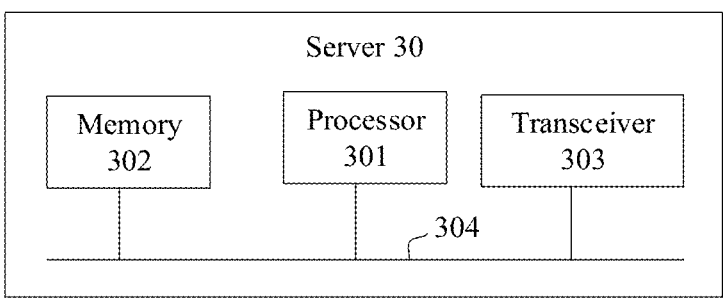
FIG. 3 is a schematic diagram of a structure of a server 30 according to an embodiment of this application.

FIG. 3 is a schematic diagram of a structure of a server 30 according to an embodiment of this application. As shown in FIG. 3, the server 30 may be the server in the embodiment shown in FIG. 1. The server 30 includes a processor 301, a memory 302 (one or more computer-readable storage media), and a transceiver 303. These components may communicate with each other through one or more buses 304.

The processor 301 may be one or more CPUs. When the processor 301 is one CPU, the CPU may be a single-core CPU, or may be a multi-core CPU.

The memory 302 may be connected to the processor 301 through the bus 304, or may be coupled to the processor 301, and is configured to store various program code and/or a plurality of groups of instructions and data (for example, map data and pose data). In an exemplary implementation, the memory 302 includes but is not limited to a random access memory (RAM), a read-only memory (ROM), an erasable programmable read-only memory (EPROM), a portable read-only memory (Compact Disc Read-Only Memory, CD-ROM), or the like.

The transceiver 303 mainly integrates a receiver and a transmitter. The receiver is configured to receive data (for example, a request or an image) sent by an electronic device, and the transmitter is configured to send data (for example, map data or pose data) to the electronic device.

It should be understood that the server 30 shown in FIG. 3 is merely an example provided in this embodiment of this application, and the server 30 may further have more components than those shown in the figure. This is not specifically limited in embodiments of this application.

In this embodiment of this application, the processor 301 runs program code stored in the memory 302, to perform various function applications and data processing of the server 30.

The term "coupling" used in embodiments of this application means a direct connection or a connection through one or more intermediate components or circuits.

Figure 4A:
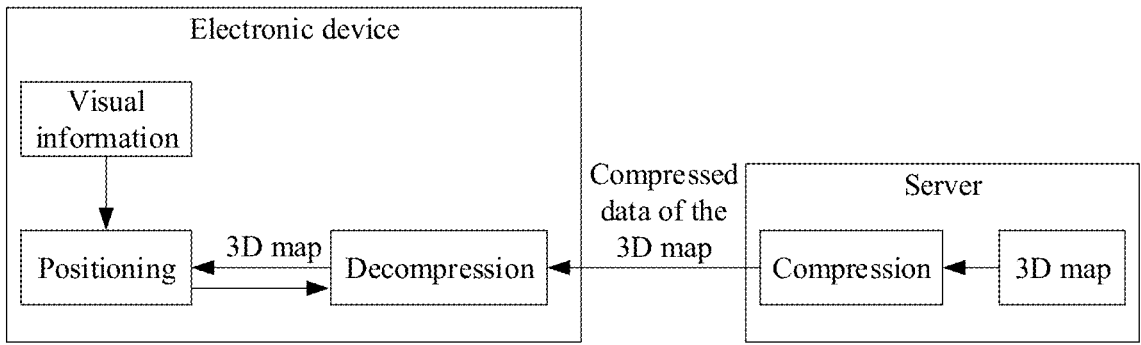
FIG. 4a to FIG. 4f are schematic diagrams of an application scenario according to an embodiment of this application.

FIG. 4a is a schematic diagram of an application scenario according to an embodiment of this application. As shown in FIG. 4a, in the application scenario, an electronic device collects visual information by using a sensor, and determines a current pose of the electronic device with reference to the visual information and a 3D map from a server.

The 3D map is provided by the server. To be specific, the server creates the 3D map, then compresses the 3D map, and transmits compressed data of the 3D map to the electronic device. After receiving the compressed data of the 3D map, the electronic device performs decompression to obtain reconstructed data of the 3D map, and determines the current pose of the electronic device with reference to the collected visual information and the reconstructed data of the 3D map. The pose is location information of the electronic device, and may be an absolute pose in the world coordinate system, or may be a relative pose relative to a point in an environment.

In this embodiment of this application, the server may create the 3D map in advance, compress the 3D map, and then store compressed data of the 3D map locally. In this way, storage space can be saved. In addition, the server may transmit the compressed data of the 3D map to another device, for example, a cloud storage.

1. The server creates the 3D map, compresses the 3D map to obtain the compressed data of the 3D map, and stores the compressed data locally.

The server compresses the 3D map, to save local storage space.

2. The electronic device sends a map download request to the server. The map download request is triggered in two manners:

(1) A user starts a map application installed on the electronic device, and the application uploads, to a server corresponding to the application, location information obtained based on GPS positioning or Wi-Fi positioning. The upload operation may trigger a map download request. Because uploaded content includes the location information, the server may perform preliminary estimation based on the location information, and transmit, to the electronic device, compressed data of a 3D map of an area to which a positioning point indicated by the location information belongs. A range of the area to which the positioning point indicated by the location information belongs may be preset. For example, the area to which the positioning point belongs may be an administrative region (including a county, a city, a country, or an administrative region) at any level in which the positioning point is located, or may be a circular area centered on the positioning point and using a specified distance as a radius.

(2) The user starts a map application installed on the electronic device, and actively enters or selects an area on the application. For example, the user actively enters "xx business center", or selects "street A" from a list of "street A, street B, and street C". The foregoing operations of the user may trigger a map download request. Regardless of whether the user enters or selects a geographical location, the server accordingly transmits compressed data of a 3D map of the geographical location to the electronic device.

It should be understood that, in this embodiment of this application, in addition to the foregoing two manners, another manner may be used for triggering a map download request. For example, the electronic device automatically detects whether a condition for downloading a 3D map or starting downloading a 3D map is satisfied, or the electronic device starts downloading a 3D map upon detecting an ambient light change or an environment change, to request the server to download a 3D map of an area range. A size of the area range is not specifically limited.

3. The server sends the compressed data of the 3D map to the electronic device.

4. The electronic device collects the visual information by using the sensor.

It should be noted that step 3 and step 4 are independent of each other, and a sequence is not limited.

5. The electronic device decompresses the compressed data of the 3D map to obtain the reconstructed data of the 3D map.

6. The electronic device performs positioning in the 3D map based on the visual information, to obtain a pose corresponding to the visual information.

After receiving the compressed data of the 3D map, the electronic device does not need to immediately decompress the compressed data, and needs to decompress the compressed data to obtain the reconstructed data of the 3D map only before performing positioning based on the visual information. For example, the user may pre-download compressed data of a 3D map of an area range by downloading an "offline map", and decompress the compressed data of the 3D map only when positioning is required.

Figure 4B:
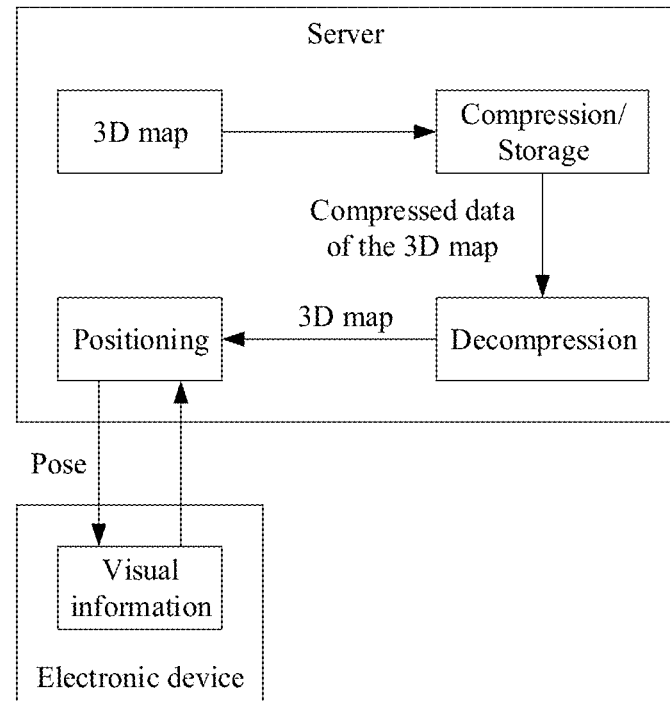

FIG. 4b is a schematic diagram of an application scenario according to an embodiment of this application. As shown in FIG. 4b, in the application scenario, an electronic device collects visual information by using a sensor, and a server determines a current pose of the electronic device with reference to the visual information from the electronic device and a 3D map.

The 3D map is provided by the server. To be specific, the server creates the 3D map, then compresses the 3D map, and stores compressed data of the 3D map locally. When receiving the visual information from the electronic device, the server performs decompression to obtain reconstructed data of the 3D map, and determines the current pose of the electronic device with reference to the visual information and the reconstructed data of the 3D map.

1. The server creates the 3D map, compresses the 3D map to obtain the compressed data of the 3D map, and stores the compressed data locally.

2. The electronic device collects the visual information by using the sensor.

3. The electronic device sends the visual information to the server.

4. The server decompresses the compressed data of the 3D map to obtain the reconstructed data of the 3D map.

It should be understood that the server compresses the 3D map to save storage space.

5. The server performs positioning in the 3D map based on the visual information, to obtain a pose corresponding to the visual information.

6. The server sends the pose to the electronic device.

Figure 4C:
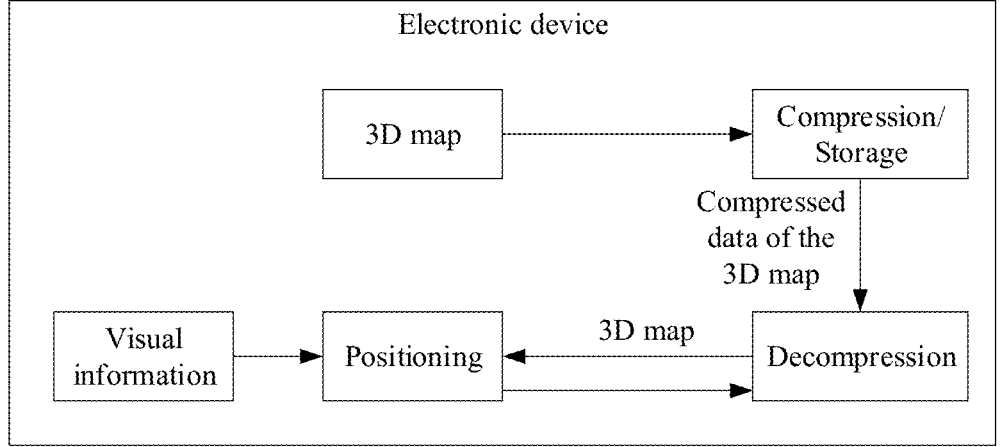

FIG. 4c is a schematic diagram of an application scenario according to an embodiment of this application. As shown in FIG. 4c, in the application scenario, an electronic device collects visual information by using a sensor, and determines a current pose of the electronic device with reference to the collected visual information and a 3D map.

The 3D map is provided by the electronic device. To be specific, the electronic device creates the 3D map, then compresses the 3D map, and stores compressed data of the 3D map locally. When the visual information is collected, the electronic device performs decompression to obtain reconstructed data of the 3D map, and determines the current pose of the electronic device with reference to the collected visual information and the reconstructed data of the 3D map.

1. The electronic device creates the 3D map, compresses the 3D map to obtain the compressed data of the 3D map, and stores the compressed data locally.

It should be understood that the electronic device compresses the 3D map to save storage space.

2. The electronic device collects the visual information by using the sensor.

3. The electronic device decompresses the compressed data of the 3D map to obtain the reconstructed data of the 3D map.

4. The electronic device performs positioning in the 3D map based on the visual information, to obtain a pose corresponding to the visual information.

Figure 4D:
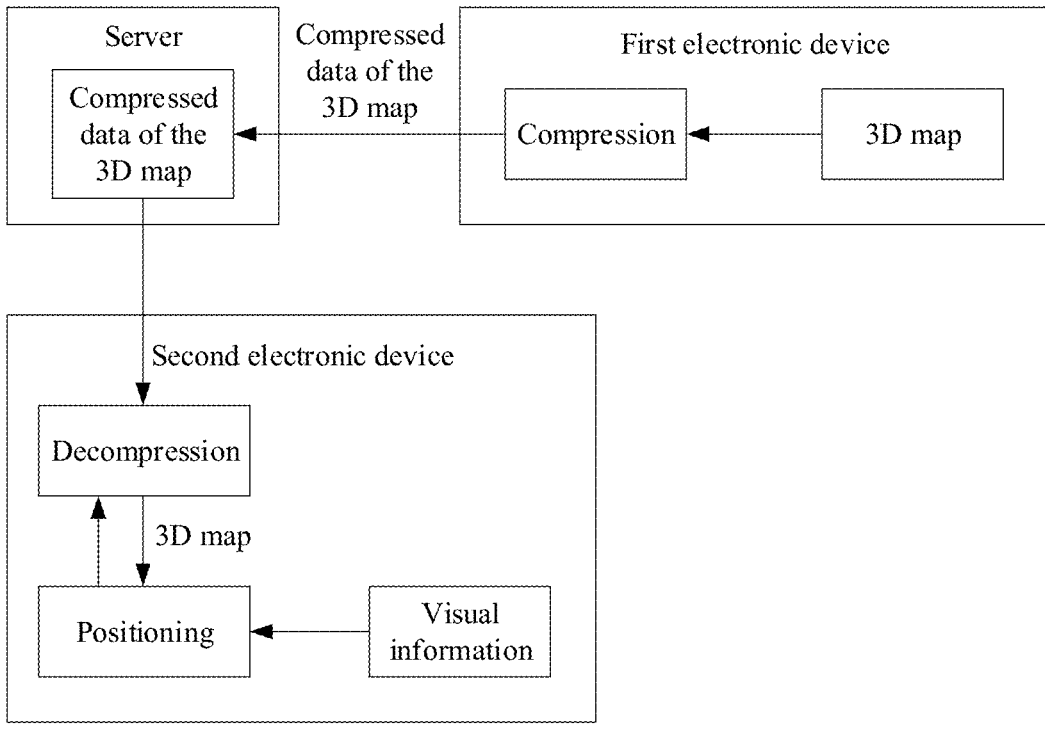

FIG. 4d is a schematic diagram of an application scenario according to an embodiment of this application. As shown in FIG. 4b, in the application scenario, a second electronic device collects visual information by using a sensor, and determines a current pose of the second electronic device with reference to the visual information and a 3D map from a server.

The 3D map is created by the first electronic device. To be specific, the first electronic device creates the 3D map, compresses the 3D map, and then sends compressed data of the 3D map to the server. The server then sends the compressed data of the 3D map to the second electronic device. The second electronic device performs decompression to obtain reconstructed data of the 3D map, and determines the current pose of the second electronic device with reference to the collected visual information and the reconstructed data of the 3D map.

In this embodiment of this application, the first electronic device may create the 3D map in advance, compress the 3D map, and then transmit the compressed data of the 3D map to the server. In this way, transmission bandwidth can be reduced.

1. The first electronic device creates the 3D map, compresses the 3D map to obtain the compressed data of the 3D map.

2. The first electronic device sends the compressed data of the 3D map to the server.

The first electronic device compresses the 3D map and then transmits the compressed data of the 3D map, to reduce transmission bandwidth, and improve transmission efficiency.

3. The second electronic device sends a map download request to the server.

The second electronic device may send the map download request based on a trigger manner shown in FIG. 4a.

4. The server sends the compressed data of the 3D map to the second electronic device.

5. The second electronic device decompresses the compressed data of the 3D map to obtain the reconstructed data of the 3D map.

6. The second electronic device collects the visual information by using the sensor.

7. The second electronic device performs positioning in the 3D map based on the visual information, to obtain a pose corresponding to the visual information.

Figure 4E:
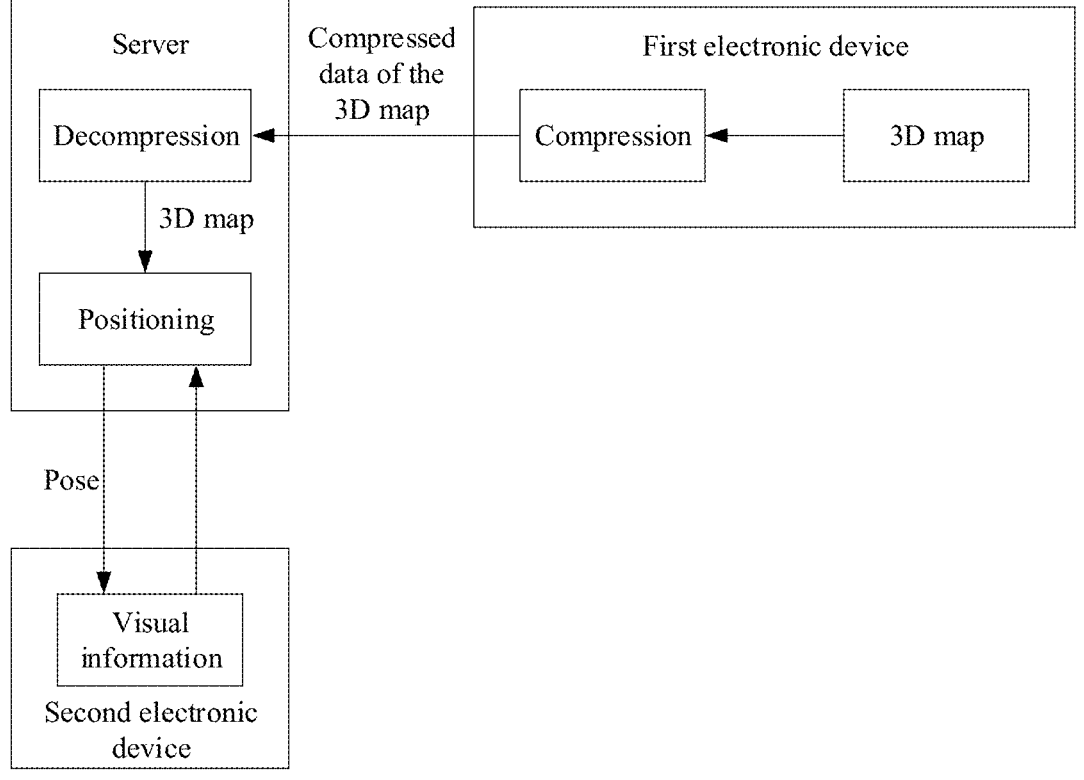

FIG. 4e is a schematic diagram of an application scenario according to an embodiment of this application. As shown in FIG. 4c, in the application scenario, a second electronic device collects visual information by using a sensor, and a server determines a current pose of the second electronic device with reference to the visual information from the second electronic device and a 3D map from a first electronic device.

The 3D map is created by the first electronic device. To be specific, the first electronic device creates the 3D map, compresses the 3D map, and then sends compressed data of the 3D map to the server. The server performs decompression to obtain reconstructed data of the 3D map, and determines the current pose of the second electronic device with reference to the visual information from the second electronic device and the reconstructed data of the 3D map.

1. The first electronic device creates the 3D map, compresses the 3D map to obtain the compressed data of the 3D map.

2. The first electronic device sends the compressed data of the 3D map to the server.

3. The second electronic device collects the visual information by using the sensor.

4. The second electronic device sends a positioning request to the server, where the positioning request carries the visual information.

5. The server decompresses the compressed data of the 3D map to obtain the reconstructed data of the 3D map.

6. The server performs positioning in the 3D map based on the visual information, to obtain a pose corresponding to the visual information.

7. The server sends, to the second electronic device, the pose obtained through positioning.

Figure 4F:
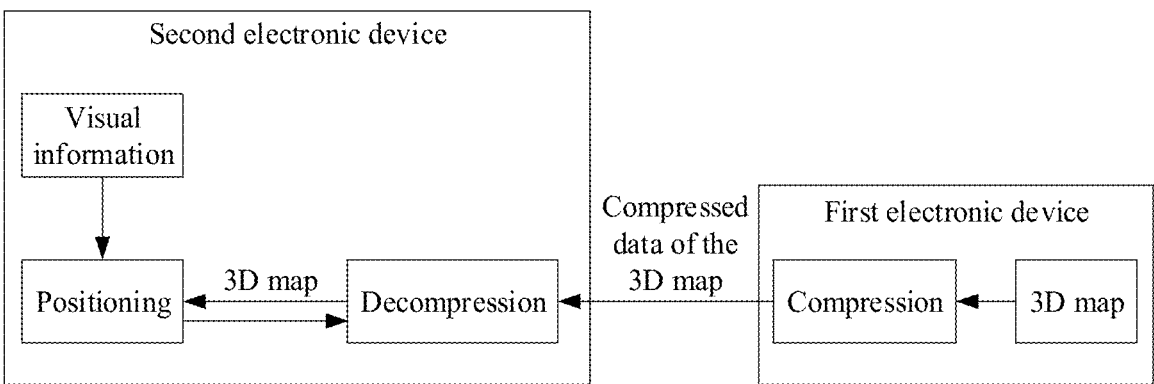

FIG. 4f is a schematic diagram of an application scenario according to an embodiment of this application. As shown in FIG. 4d, in the application scenario, a second electronic device collects visual information by using a sensor, and determines a current pose of the second electronic device with reference to the visual information and a 3D map from a first electronic device.

The 3D map is created by the first electronic device. To be specific, the first electronic device creates the 3D map, compresses the 3D map, and then sends compressed data of the 3D map to the second electronic device. The second electronic device performs decompression to obtain reconstructed data of the 3D map, and determines the current pose of the second electronic device with reference to the collected visual information and the 3D map from the first electronic device.

1. The first electronic device creates the 3D map, compresses the 3D map to obtain the compressed data of the 3D map, and stores the compressed data locally.

2. The second electronic device sends a map download request to the first electronic device.

3. The first electronic device sends the compressed data of the 3D map to the second electronic device.

4. The second electronic device decompresses the compressed data of the 3D map to obtain the reconstructed data of the 3D map.

5. The second electronic device collects the visual information by using the sensor.

6. The second electronic device performs positioning in the 3D map based on the visual information, to obtain a pose corresponding to the visual information.

A positioning algorithm used in the embodiments shown in FIG. 4a to FIG. 4f may include the following.

(1) A to-be-retrieved area descriptor is extracted from the visual information, where an algorithm used for extracting the to-be-retrieved area descriptor is consistent with an algorithm for extracting an area descriptor from the 3D map.

(2) A to-be-retrieved 3D map point is extracted from the visual information, and a to-be-retrieved 3D map point spatial location and a to-be-retrieved 3D map point descriptor are obtained, where an algorithm for extracting the to-be-retrieved 3D map point descriptor is consistent with an algorithm for extracting a 3D map point descriptor from the 3D map.

(3) Retrieval is performed in a plurality of area descriptors included in data of the 3D map based on the to-be-retrieved area descriptor, to obtain a plurality of candidate area descriptors.

In embodiments of this application, a distance between the to-be-retrieved area descriptor and each area descriptor in the plurality of area descriptors may be calculated. The distance may include a Hamming distance, a Manhattan distance, a Euclidean distance, or the like. Then, at least one area descriptor that satisfies a condition (for example, the distance is less than a threshold) is selected as a candidate area descriptor.

(4) Matching is separately performed between the to-be-retrieved 3D map point descriptor and 3D map point descriptors corresponding to a plurality of candidate area descriptors. The matching is to separately calculate a similarity between the to-be-retrieved 3D map point descriptor and the 3D map point descriptors corresponding to the plurality of candidate area descriptors, to find a most similar 3D map point.

(5) The pose of the electronic device is calculated based on the found 3D map point by using a pose solution algorithm such as PnP or EPnP in ORB-SLAM2.

Figure 4G:
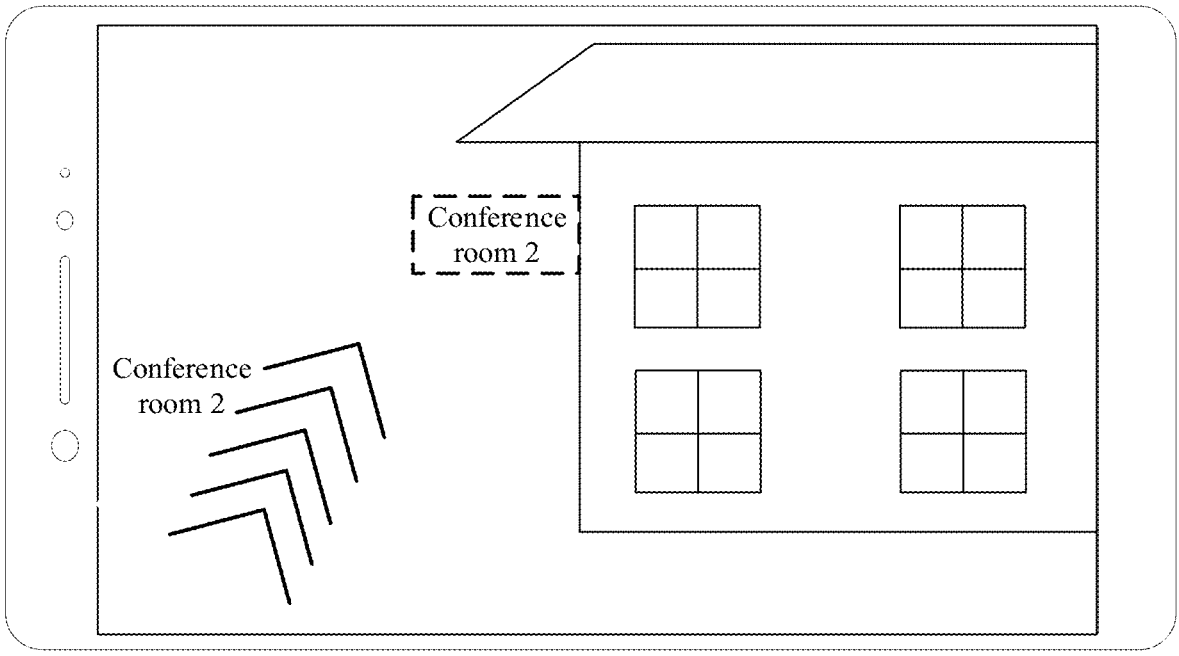
FIG. 4g is a schematic diagram of a user interface displayed by an electronic device according to an embodiment of this application.

In any one of the application scenarios in FIG. 4a to FIG. 4f, positioning is performed based on the 3D map in embodiments of this application, to obtain the current pose of the electronic device. The pose may be applied to fields such as AR navigation, AR human-computer interaction, assisted driving, and autonomous driving. For example, AR navigation based on the pose is used as an example. FIG. 4g is a schematic diagram of a user interface displayed by an electronic device according to an embodiment of this application. The electronic device may display, based on the pose, the user interface shown in FIG. 4g. The user interface may include an indication of a navigation arrow headed to a conference room 2, and the indication of the navigation arrow headed to the conference room 2 may be a virtual object obtained from a server based on the pose or obtained locally based on the pose. The user interface may further include visual information collected by a sensor, for example, a building shown in FIG. 4g. The user goes to the conference room 2 with reference to the user interface of the electronic device shown in FIG. 4g.

It should be noted that reconstructed data, obtained through decompression, of a 3D map in embodiments of this application may also be referred to as reconstructed data of the 3D map.

The embodiments shown in FIG. 4a to FIG. 4f are all related to compression and decompression of the 3D map. Embodiments of this application provide a plurality of methods for performing the foregoing compression and decompression. The following describes the compression and decompression methods.

Based on the foregoing description, the following provides some methods for compressing a 3D map according to embodiments of this application. For convenience, the method embodiments described below are expressed as a combination of a series of action steps. However, a person skilled in the art should understand that exemplary implementations of the technical solutions of this application are not limited to a sequence of the described series of action steps.

Figure 5:
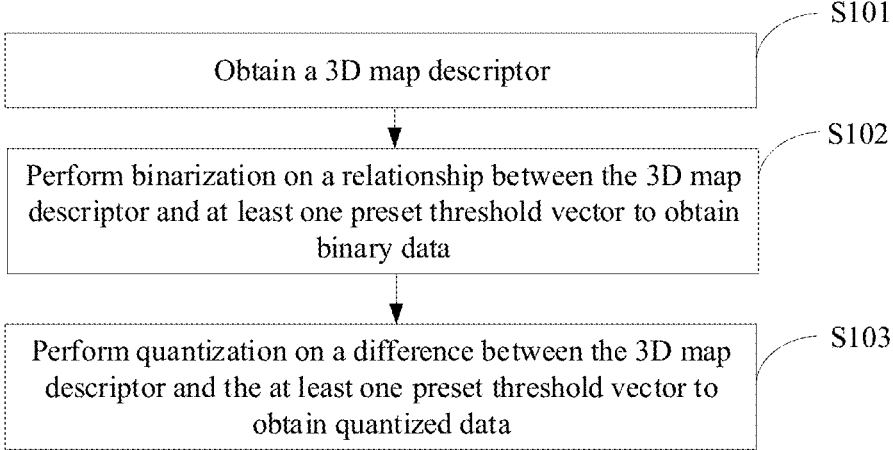
FIG. 5 is a schematic flowchart of a method for compressing a 3D map according to an embodiment of this application.

Refer to FIG. 5. FIG. 5 is a schematic flowchart of a method for compressing a 3D map according to an embodiment of this application. In some implementations, the method may be applied to the electronic device (for example, the first electronic device or the second electronic device) in any one of examples of FIG. 1 to FIG. 4f, or may be applied to the server in any one of examples of FIG. 1 to FIG. 4f. An execution body for performing the method for compressing a 3D map in embodiments of this application may also be referred to as a compressor end or an encoder end. The method includes but is not limited to the following steps.

S101: Obtain a 3D map descriptor.

The 3D map descriptor corresponds to at least one 3D map point of a 3D map. The 3D map descriptor may be a vector, for example, a 128-dimensional vector or a 512-dimensional vector. A quantity of dimensions of the 3D map descriptor is not limited to the foregoing example, and may be another value. Examples are not described one by one in this embodiment of this application. Specifically, the 3D map descriptor may be an area descriptor or a 3D map point descriptor. One area descriptor may correspond to a plurality of 3D map points. For specific explanations and descriptions, refer to the explanations and descriptions in the foregoing embodiment. Details are not described herein again. The 3D map descriptor herein is a 3D map descriptor that needs to be compressed by using subsequent steps. A data volume of the 3D map descriptor is reduced by compressing the 3D map descriptor.

S102: Perform binarization on a relationship between the 3D map descriptor and at least one preset threshold vector to obtain binary data.

Each component included in any preset threshold vector in the at least one preset threshold vector is any value. A quantity of components (that is, a quantity of vector dimensions) included in any preset threshold vector may be the same as or different from a quantity of components included in the 3D map descriptor, and may be properly set as required. A value of a component included in any preset threshold vector may also be properly set as required. For example, a value of a component included in the at least one preset threshold vector may be set based on value ranges of some 3D map descriptors that need to be compressed.

Binarization means processing a relationship between a 3D map descriptor and at least one preset threshold vector into a binary string represented by a binary symbol, that is, binary data. A quantity of bits in the binary data is usually obviously less than a quantity of bits in original data (for example, an original 3D map descriptor), to save storage space and/or transmission resource overheads. In addition, a calculation amount of a Hamming distance between the binary data is usually less than that of a distance such as a Euclidean distance or an inner product distance between the original data, thereby reducing calculation complexity.

The binarization may be, for example, hash processing. A principle of hashing is to map a relationship between a 3D map descriptor and at least one preset threshold vector to a Hamming space (binary space), to generate a binary hash code. A quantity of bits in a hash code is usually obviously less than a quantity of bits in original data, to save storage and transmission bandwidth. In addition, a calculation amount of a Hamming distance between hash codes is usually less than that of a Euclidean distance of the original data, thereby reducing calculation complexity. The binarization includes but is not limited to: iterative quantization (ITQ) hashing, locality-sensitive hashing (LSH), spectral hashing, or the like. In some embodiments, the foregoing binarization may be at least one stage of binarization. Two-stage binarization is used as an example, different binarization manners, or a same binarization manner may be used for the two-stage binarization. Lengths of binary data respectively obtained through two stages of binarization may be the same or may be different. For example, for a component of a 3D map descriptor, a length of binary data obtained through one stage of binarization in the two-stage binarization may be 1, and a length of binary data obtained through the other stage of binarization may be 2. The two-stage binarization may be further associated with quantization in a subsequent step. For example, the subsequent quantization may be two-stage quantization. Precision of one stage of quantization may be higher than precision of the other stage of quantization.

A length of binary data in embodiments of this application may be a quantity of bits (also referred to as a bit quantity) of the binary data. For example, if the binary data is 110, the quantity of bits in the binary data is 3.

The relationship between the 3D map descriptor and the at least one preset threshold vector in this embodiment of this application includes but is not limited to: an orthogonal relationship between the 3D map descriptor and the at least one preset threshold vector, a magnitude relationship between the 3D map descriptor and the at least one preset threshold vector, or the like. The magnitude relationship between the 3D map descriptor and the at least one preset threshold vector may include but is not limited to: a magnitude relationship between each component of the 3D map descriptor and a corresponding component of the at least one preset threshold vector. For example, the 3D map descriptor is $(a_1, a_2, \ldots, a_M)$, M represents a quantity of vector dimensions, $a_i$ represents an $i^{th}$ component of the 3D map descriptor, a preset threshold vector is $(q_1, q_2, \ldots, q_M)$, $q_i$ represents an $i^{th}$ component of the preset threshold vector, and $i \in [1,M]$. The magnitude relationship between each component of the 3D map descriptor and the corresponding component of the at least one preset threshold vector may include a magnitude relationship between components $a_1$ and $q_1$, a magnitude relationship between components $a_2$ and $q_2, \ldots$, and a magnitude relationship between components $a_M$ and $q_M$. Certainly, it may be understood that, in the foregoing example, that a quantity of vector dimensions is the same between the preset threshold vector and the 3D map descriptor and the magnitude relationship is a magnitude relationship between components at a same position is used as an example for description, and there may be another implementable manner. For example, a quantity of vector dimensions of a preset threshold vector is greater than a quantity of dimensions of the 3D map descriptor, and the magnitude relationship is a magnitude relationship between components at different positions, such as components $a_1$ and $q_2$. Examples are not described one by one in this embodiment of this application.

S103: Perform quantization on a difference between the 3D map descriptor and the at least one preset threshold vector to obtain quantized data.

The quantization includes but is not limited to scalar quantization, vector quantization, product quantization, or the like. For example, the difference between the 3D map descriptor and the at least one preset threshold vector may be compressed into one or more quantization indexes through quantization, and the one or more quantization indexes are quantized data of the difference. Each quantization index in the one or more quantization indexes corresponds to one quantization center. A quantity of bits in the quantization index is usually obviously less than a quantity of bits in original data (for example, an original 3D map descriptor), to save storage space and/or transmission resource overheads.

The difference between the 3D map descriptor and the at least one preset threshold vector in this embodiment of this application includes but is not limited to: a difference value between the 3D map descriptor and the at least one preset threshold vector, an absolute value of a difference value between the 3D map descriptor and the at least one preset threshold vector, or the like. The difference value between the 3D map descriptor and the at least one preset threshold vector may include a difference value between each component of the 3D map descriptor and a corresponding component of the at least one preset threshold vector. An example in which the 3D map descriptor is $(a_1, a_2, \ldots, a_M)$ and a preset threshold vector is $(q_1, q_2, \ldots, q_M)$ is used for further description. Difference values between components of the 3D map descriptor and corresponding components of the at least one preset threshold vector may include a difference value between components $a_1$ and $q_1$, and a difference value between components $a_2$ and $q_2, \ldots,$ and a difference value between components $a_M$ and $q_M$.

For explanations and descriptions of the at least one preset threshold vector in this step, refer to the explanations and descriptions of the at least one preset threshold vector in S102. Details are not described herein again. It should be noted that, in some embodiments, the at least one preset threshold vector in S103 may be a part of the at least one preset threshold vector in S102. In some embodiments, the at least one preset threshold vector in S103 may be all of the at least one preset threshold vector in S102.

The original 3D map descriptor may be compressed into the binary data and the quantized data by using the foregoing steps. Optionally, in this embodiment of this application, the binary data and the quantized data may be separately stored or transmitted, or the binary data and the quantized data may be simply spliced together for storage or transmission. Optionally, for transmission of the binary data and the quantized data, in this embodiment of this application, the binary data and the quantized data may be further encapsulated to obtain a bitstream of the 3D map, and the bitstream of the 3D map is transmitted. The data volume may be further reduced through encapsulation, thereby reducing resource overheads required for transmitting the 3D map descriptor. The encapsulation may use any encoding algorithm, for example, entropy encoding. Entropy encoding is a lossless data compression method. Entropy encoding algorithms include but are not limited to: Huffman encoding, arithmetic encoding, a compression/decompression algorithm improved based on an LZ77 compression algorithm (lempel-ziv-markov chain-algorithm, LZMA), a function library algorithm for data compression (zlib), and the like.

Optionally, before the encapsulation, another compression manner such as prediction may be further performed. Examples are not described one by one in this embodiment of this application.

For transmission of the bitstream of the 3D map, in an implementable manner, an execution body of this embodiment of this application may receive 3D map request information sent by an electronic device. For example, the 3D map request information may be a map download request in FIG. 4*a*. The execution body of this embodiment of this application may send, to the electronic device in response to the 3D map request information, the bitstream of the 3D map corresponding to the 3D map request information. In an implementable manner, an execution body of this embodiment of this application may send the bitstream of the 3D map to a server.

In this embodiment, binarization is performed on the relationship between the 3D map descriptor and the at least one preset threshold vector to obtain the binary data, and quantization is performed on the difference between the 3D map descriptor and the at least one preset threshold vector to obtain the quantized data. A quantity of bits in the binary data and the quantized data is less than a quantity of bits in an original 3D map descriptor, to save storage space and/or transmission resource overheads.

The compression method in this embodiment of this application may further provide a basis for a method for retrieving a 3D map, to optimize efficiency in retrieving a 3D map. For example, the compressed data of the 3D map is obtained based on the method for compressing a 3D map in this embodiment of this application, and the compressed data of the 3D map includes the binary data and the quantized data of a 3D map descriptor. When the compressed data of the 3D map is used for retrieval, retrieval may be first performed in the compressed data of the 3D map based on a Hamming distance by using binary data of a retrieval 3D map descriptor, to obtain candidate 3D map descriptors, so as to improve a retrieval speed. Then, the candidate 3D map descriptors are decompressed to obtain reconstructed data of the candidate 3D map descriptors. Refined retrieval is performed in the reconstructed data of the candidate 3D map descriptors by using the retrieval 3D map descriptor, to improve retrieval accuracy. According to the method for retrieving a 3D map based on the compression method in this embodiment of this application, comprehensive optimization of a retrieval speed and retrieval precision can be achieved.

Refer to FIG. 6. FIG. 6 is a schematic flowchart of a method for decompressing a 3D map according to an embodiment of this application. In some implementations, the method may be applied to the electronic device (for example, the first electronic device or the second electronic device) in any one of examples of FIG. 1 to FIG. 4*f*, or may be applied to the server in any one of examples of FIG. 1 to FIG. 4*f*. An execution body for performing the method for decompressing a 3D map in embodiments of this application may also be referred to as a decompressor end or a decoder end. The method includes but is not limited to the following steps.

S201: Obtain compressed data of a 3D map, where the compressed data includes binary data and quantized data.

The binary data and the quantized data may be binary data and quantized data of a 3D map descriptor. For explanations and descriptions of the 3D map descriptor, refer to the explanations and descriptions of S101. Details are not described herein again.

In an implementable manner, an execution body of this embodiment of this application may obtain the binary data and the quantized data of the 3D map descriptor from a memory, and obtain a reconstructed 3D map descriptor by using the following S202. In another implementable manner, an execution body of this embodiment of this application may obtain the compressed data of the 3D map from a memory, decompress the compressed data of the 3D map to obtain the binary data and the quantized data of the 3D map descriptor, and obtain the reconstructed 3D map descriptor by using the following S202. The decompression may include but is not limited to a decompression manner such as prediction. In another possible implementation, an execution body of this embodiment of this application may receive a bitstream of the 3D map, decompress the bitstream of the 3D map to obtain the binary data and the quantized data of the 3D map descriptor, and obtain the reconstructed 3D map descriptor by using the following S202. The decompression may include decapsulation, or decapsulation and prediction. The decapsulation includes but is not limited to entropy decoding. Such decompression may also be referred to as decoding.

For transmission of the bitstream of the 3D map, in an implementable manner, an execution body of this embodiment of this application may send 3D map request information. For example, the 3D map request information may be a map download request in FIG. 4a. The execution body of this embodiment of this application may receive the bitstream of the 3D map corresponding to the 3D map request information. In another implementable manner, an execution body of this embodiment of this application may receive the bitstream of the 3D map sent by another device.

S202: Obtain a reconstructed 3D map descriptor based on the binary data and the quantized data.

The reconstructed 3D map descriptor, for example, a reconstructed area descriptor or a reconstructed 3D map point descriptor, may be obtained based on the binary data and the quantized data. For example, the compression method in the embodiment shown in FIG. 5 is used to compress the 3D map descriptor, to obtain the compressed data of the 3D map, so as to save storage space and/or transmission resource overheads. When the 3D map descriptor needs to be used, the decompression method in this embodiment may be used to decompress the compressed data of the 3D map, so as to obtain the reconstructed 3D map descriptor. The reconstructed 3D map descriptor may be approximately the same as or completely the same as the 3D map descriptor.

In an implementable manner, dequantization may be performed on the quantized data to obtain a difference between the reconstructed 3D map descriptor and at least one preset threshold vector. The reconstructed 3D map descriptor is obtained based on the difference, the binary data, and the at least one preset threshold vector, where the binary data indicates a relationship between the reconstructed 3D map descriptor and the at least one preset threshold vector. Each component included in any preset threshold vector in the at least one preset threshold vector is any value. The difference between the reconstructed 3D map descriptor and the at least one preset threshold vector may be recovered from the quantized data through dequantization. For example, the dequantization process may be an inverse process of S103 in the embodiment shown in FIG. 5. For specific explanations and descriptions of the difference, refer to specific explanations and descriptions of S103. Details are not described herein again. The binary data indicates the relationship between the reconstructed 3D map descriptor and the at least one preset threshold vector. For the explanations and descriptions of the relationship, refer to the specific explanations and descriptions of S102. Details are not described herein again. In this embodiment, the difference between the reconstructed 3D map descriptor and the at least one preset threshold vector may be obtained through dequantization, the relationship between the reconstructed 3D map descriptor and the at least one preset threshold vector may be obtained based on the binary data, and then the reconstructed 3D map descriptor may be obtained with reference to the at least one preset threshold vector.

In this embodiment, the binary data and the quantized data of the 3D map descriptor are obtained, and the reconstructed 3D map descriptor is obtained based on the binary data and the quantized data. A quantity of bits in the binary data and the quantized data is less than a quantity of bits in an original 3D map descriptor, to save storage space and/or transmission resource overheads. The compressed data of the 3D map is decompressed to obtain the reconstructed 3D map descriptor, so as to perform subsequent processing, for example, positioning by using the reconstructed 3D map descriptor.

In Implementable manner 1, one preset threshold vector is used for binarization. Binarization is performed on a relationship between a 3D map descriptor and one preset threshold vector to obtain binary data. A preset threshold vector used for quantization is the same as the preset threshold vector used for the binarization. For an exemplary implementation, refer to the explanations and descriptions of the embodiment shown in FIG. 7.

Refer to FIG. 7. FIG. 7 is a schematic flowchart of a method for compressing a 3D map according to an embodiment of this application. In some implementations, the method may be applied to the electronic device (for example, the first electronic device or the second electronic device) in any one of examples of FIG. 1 to FIG. 4f, or may be applied to the server in any one of examples of FIG. 1 to FIG. 4f. This embodiment is described by using an example in which one preset threshold vector Q is used for binarization and $Q=(q_1, q_2, \ldots, q_M)$. The method includes but is not limited to the following steps.

S301: Obtain a 3D map descriptor.

For specific explanations and descriptions of the 3D map descriptor, refer to S101 in the embodiment shown in FIG. 5. Details are not described herein again. This embodiment is described by using an example in which the 3D map descriptor is D and $D=(a_1, a_2, \ldots, a_M)$.

S302: Subtract, from each component of the 3D map descriptor, a corresponding component of the preset threshold vector, to obtain a difference value of each component.

D' is a difference value between the 3D map descriptor and the preset threshold vector, and $D'=D-Q$.

The corresponding component of the preset threshold vector may be a component that is in the preset threshold vector and that is at a same position as a component of the 3D map descriptor. For example, the difference value of each component includes: $a_1$ minus $q_1$, $a_2$ minus $q_2$, $\ldots$, and $a_M$ minus $q_M$. Certainly, it may be understood that, optionally, the corresponding component of the preset threshold vector may be a component that is in the preset threshold vector and that is at a different position from a component of the 3D map descriptor. This embodiment of this application is not limited thereto.

S303: Perform binarization on the difference value of each component to obtain binary data.

A magnitude relationship between each component of the 3D map descriptor and a corresponding component of the preset threshold vector may be determined by using the difference value of each component. For example, if $a_1$ minus $q_1$ is less than 0, $a_1$ is less than $q_1$. If $a_1$ minus $q_1$ is greater than 0, $a_1$ is greater than $q_1$. If $a_1$ minus $q_1$ is equal to 0, $a_1$ is equal to $q_1$. In this embodiment, binarization may be performed on the magnitude relationship to obtain the binary data. For example, H is binary data, H includes M pieces of bit information, and $H=(h_1, h_2, \ldots, h_M)$. In an implementable manner, if $a_i$ minus $q_i$ is greater than or equal to 0, $h_i$ is 1; or if $a_i$ minus $q_i$ is less than 0, $h_i$ is 0. In another implementable manner, if $a_i$ minus $q_i$ is greater than or equal to 0, $h_i$ is 0; or if $a_i$ minus $q_i$ is less than 0, $h_i$ is 1. Certainly, it may be understood that the following may alternatively be set: If $a_i$ minus $q_i$ is greater than 0, $h_i$ is 1, or if $a_i$ minus $q_i$ is less than or equal to 0, $h_i$ is 0; or if $a_i$ minus $q_i$ is greater than 0, $h_i$ is 0, or if $a_i$ minus $q_i$ is less than or equal to 0, $h_i$ is 1. This may be properly set as required.

It may be understood that when $q_1, q_2, \ldots,$ and $q_M$ are all zeros, the binarization means performing binarization on a symbol of each component of the 3D map descriptor.

S304: Determine, based on the difference value of each component, an absolute value of a difference value between each component of the 3D map descriptor and a corresponding component of the preset threshold vector.

D" is an absolute value of a difference value between the 3D map descriptor and the preset threshold vector, and D"=|D'|. Absolute values of difference values of components include: an absolute value of a difference value between $a_1$ and $q_1$, an absolute value of a difference value between $a_2$ and $q_2, \ldots,$ and an absolute value of a difference value between $a_M$ and $q_M$.

S305: Perform quantization on the absolute value of the difference value between each component of the 3D map descriptor and the corresponding component of the preset threshold vector, to obtain quantized data.

Quantization, for example, the foregoing scalar quantization, vector quantization, product quantization, or another quantization manner, is performed on D", to obtain the quantized data.

The compressed data of the 3D map descriptor may be obtained by using the foregoing steps, and the compressed data of the 3D map descriptor may include the binary data and the quantized data. The compressed data of the 3D map descriptor may be stored, to save storage space. Alternatively, the compressed data of the 3D map descriptor may be encapsulated and transmitted, to reduce resource overheads required for transmitting the 3D map.

In this embodiment, binarization is performed on the magnitude relationship between the 3D map descriptor and the preset threshold vector to obtain the binary data, and quantization is performed on the absolute value of the difference value between the 3D map descriptor and the preset threshold vector to obtain the quantized data. A quantity of bits in the binary data and the quantized data is less than a quantity of bits in an original 3D map descriptor, to save storage space and/or transmission resource overheads.

Refer to FIG. 8. FIG. 8 is a schematic flowchart of a method for decompressing a 3D map according to an embodiment of this application. In some implementations, the method may be applied to the electronic device (for example, the first electronic device or the second electronic device) in any one of examples of FIG. 1 to FIG. 4f, or may be applied to the server in any one of examples of FIG. 1 to FIG. 4f. An execution body for performing the method for decompressing a 3D map in embodiments of this application may also be referred to as a decompressor end or a decoder end. The method includes but is not limited to the following steps.

S401: Obtain compressed data of a 3D map, where the compressed data includes binary data and quantized data.

The binary data and the quantized data may be obtained by using the embodiment shown in FIG. 7.

S402: Perform dequantization on the quantized data to obtain dequantized data.

DQ is the dequantized data, and the dequantized data may be an absolute value of a difference value between each component of a reconstructed 3D map descriptor and a component corresponding to a preset threshold vector. The preset threshold vector may be the preset threshold vector Q used in the embodiment shown in FIG. 7. The absolute value of the difference value between each component of the reconstructed 3D map descriptor and the corresponding component of the preset threshold vector may be recovered from the quantized data through dequantization. For example, the dequantization process may be an inverse process of the quantization in the embodiment shown in FIG. 7.

S403: Obtain a difference value of each component based on the binary data and the dequantized data.

DQ' is a difference value between the reconstructed 3D map descriptor and the preset threshold vector. DQ' includes the difference value between each component of the reconstructed 3D map descriptor and the corresponding component of the preset threshold vector, that is, the difference value of each component.

A magnitude relationship between each component of the reconstructed 3D map descriptor and the corresponding component of the preset threshold vector may be determined based on the binary data, and then the difference value between each component of the reconstructed 3D map descriptor and the corresponding component of the preset threshold vector may be obtained with reference to the absolute value of the difference value between each component of the reconstructed 3D map descriptor and the corresponding component of the preset threshold vector. For example, based on the magnitude relationship between each component of the reconstructed 3D map descriptor and the corresponding component of the preset threshold vector, a positive sign or a negative sign is added to the absolute value of the difference value between each component of the reconstructed 3D map descriptor and the corresponding component of the preset threshold vector, to obtain the difference value of each component.

S404: Obtain the reconstructed 3D map descriptor based on the difference value of each component and the preset threshold vector.

During compression, from each component of the 3D map descriptor, the corresponding component of the preset threshold vector is subtracted, to obtain the difference value of each component. Therefore, during decompression, the difference value of each component is added to the corresponding component of the preset threshold vector, to obtain components of the reconstructed 3D map descriptor. D_recover is the reconstructed 3D map descriptor. D_recover=DQ'+Q.

It should be noted that this embodiment is described by using an example in which during compression, from each component of the 3D map descriptor, the corresponding component of the preset threshold vector is subtracted, and during decompression, the difference value of each component is added to the corresponding component of the preset threshold vector. Another manner may alternatively be used.

For example, during compression, each component of the 3D map descriptor is added to the corresponding component of the preset threshold vector, and during decompression, from the difference value of each component, the corresponding component of the preset threshold vector is subtracted. This embodiment of this application is not limited thereto.

In this embodiment, the binary data and the quantized data of the 3D map descriptor are obtained, and the reconstructed 3D map descriptor is obtained based on the binary data and the quantized data. A quantity of bits in the binary data and the quantized data is less than a quantity of bits in an original 3D map descriptor, to save storage space and/or transmission resource overheads. The compressed data of the 3D map is decompressed to obtain the reconstructed 3D map descriptor, so as to perform subsequent processing, for example, positioning by using the reconstructed 3D map descriptor.

It should be noted that the decompression method in this embodiment of this application may be flexibly used with reference to requirements in application scenarios with different usage requirements. For example, when the compressed data of the 3D map is used for retrieval, in order to improve a retrieval speed, retrieval may be first performed in the compressed data of the 3D map based on a Hamming distance by using binary data of a retrieval 3D map descriptor, to obtain candidate 3D map descriptors. Then, when there is a relatively high retrieval precision requirement, the candidate 3D map descriptors may be decompressed by using the foregoing decompression method to obtain reconstructed data of the candidate 3D map descriptors. Refined retrieval is performed in the reconstructed data of the candidate 3D map descriptors by using the retrieval 3D map descriptor, to improve retrieval accuracy.

In Implementable manner 2, a plurality of preset threshold vectors are used for binarization. Binarization is performed on a relationship between a 3D map descriptor and a plurality of preset threshold vectors to obtain binary data. At least one preset threshold vector used for quantization is the same as the plurality of preset threshold vectors used for the binarization.

For an exemplary implementation, refer to the explanations and descriptions of the embodiment shown in FIG. 9.

Refer to FIG. 9. FIG. 9 is a schematic flowchart of a method for compressing a 3D map according to an embodiment of this application. In some implementations, the method may be applied to the electronic device (for example, the first electronic device or the second electronic device) in any one of examples of FIG. 1 to FIG. 4f, or may be applied to the server in any one of examples of FIG. 1 to FIG. 4f. This embodiment is described by using an example in which the foregoing binarization is performed by using N preset threshold vectors, which are respectively $Q_1$, $Q_2$, . . . , $Q_N$, where $Q_1=(q_{11}, q_{12}, \ldots, q_{1M})$, $Q2=(q_{21}, q_{22}, \ldots, q_{2M})$, . . . , $Q_N=(q_{N1}, q_{N2}, \ldots, q_{NM})$. N is a positive integer greater than 1. The method includes but is not limited to the following steps.

S501: Obtain a 3D map descriptor.

For specific explanations and descriptions of the 3D map descriptor, refer to S101 in the embodiment shown in FIG. 5. Details are not described herein again. This embodiment is described by using an example in which the 3D map descriptor is D and $D=(a_1, a_2, \ldots, a_M)$.

S502: Subtract, from each component of the 3D map descriptor, corresponding components of the N preset threshold vectors, to obtain N difference value vectors, where each difference value vector includes a difference value of each component.

$D_j'$ is a difference value between the 3D map descriptor and a $j^{th}$ preset threshold vector in the N preset threshold vectors, that is, a $j^{th}$ difference value vector, where $j\in[1,N]$. $D_j'=D-Q_j$. Each component of $D_j'$ is a difference value between each component of the 3D map descriptor and each component of the $j^{th}$ preset threshold vector. $D_j'=(d_{j1}, d_{j2}, \ldots, d_{jM})$, and $d_{ji}=a_i-q_{ji}$, where $i\in[1,M]$.

A corresponding component of the $j^{th}$ preset threshold vector may be a component that is in the $j^{th}$ preset threshold vector and that is at a same position as a component of the 3D map descriptor. For example, a difference value between each component of the 3D map descriptor and a corresponding component of the $j^{th}$ preset threshold vector includes: $a_1$ minus $q_{j1}$, $a_2$ minus $q_{j2}$, . . . , $a_M$ minus $q_{jM}$. Certainly, it may be understood that, optionally, the corresponding component of the $j^{th}$ preset threshold vector may be a component that is in the $j^{th}$ preset threshold vector and that is at a different position from a component of the 3D map descriptor. This embodiment of this application is not limited thereto.

S503: Perform binarization on the difference value of each component to obtain binary data.

Binarization performed on $D_j'$ is used as an example. Binarization is performed on $D_j'$ to obtain binary data $H_j$ corresponding to $D_j'$. $H_j$ includes M pieces of bit information, and $H_j=(h_{j1}, h_{j2}, \ldots, h_{jM})$. In an implementable manner, if $a_i$ minus $q_{ji}$ is greater than or equal to 0, $h_{ji}$ is 1; or if $a_i$ minus $q_{ji}$ is less than 0, $h_{ji}$ is 0. In another implementable manner, if $a_i$ minus $q_{ji}$ is greater than or equal to 0, $h_{ji}$ is 0; or if $a_i$ minus $q_{ji}$ is less than 0, $h_{ji}$ is 1.

The binary data is obtained by using S502 and S503, and the binary data may include $H_1$, $H_2$, . . . , $H_N$.

In some embodiments, one preset threshold vector in the N preset threshold vectors used for the binarization is a minimum threshold vector or a maximum threshold vector. Each component of the minimum threshold vector is less than or equal to a minimum value of a value range of a corresponding component of the 3D map descriptor. Each component of the maximum threshold vector is greater than or equal to a maximum value of a value range of a corresponding component of the 3D map descriptor. That is, the N preset threshold vectors include the minimum threshold vector or the maximum threshold vector. The minimum threshold vector or the maximum threshold vector may ensure that at least one difference value in each dimension of the N difference value vectors is greater than or equal to 0. To be specific, at least one difference value in $d_1$, $d_{12}$, . . . , and $d_{1N}$ is greater than or equal to 0, at least one difference value in $d_{21}$, $d_{22}$, . . . , and $d_{2N}$ is greater than or equal to 0, . . . , and at least one difference value in $d_{1M}$, $d_{2M}$, . . . , and $d_{NM}$ is greater than or equal to 0. In this way, a difference value between rather than an absolute value of a difference value between a component of the 3D map descriptor and a corresponding component of the preset threshold vector may be used in subsequent quantization, to reduce calculation complexity.

In some embodiments, components at a same position of the N preset threshold vectors successively increase or decrease. Successively increasing indicates that any component of the $j^{th}$ preset threshold vector in the N preset threshold vectors is greater than or equal to a component at a same position of a $(j-1)^{th}$ preset threshold vector. Successively decreasing indicates that any component of the $j^{th}$ preset threshold vector in the N preset threshold vectors is less than or equal to a component at a same position of the $(j-1)^{th}$ preset threshold vector, where $2 \leq j \leq N$. To be specific, $q_{11}, q_{21}, \ldots, q_{N1}$ successively increase or successively decrease; $q_{12}, q_{22}, \ldots, q_{N2}$ successively increase or successively decrease $\ldots$; and $q_{1M}, q_{2M}, \ldots, q_{NM}$ successively increase or successively decrease.

The following three preset threshold vectors are used as an example: $Q_1=(q_{11}, q_{12}, \ldots, q_{1M})$, $Q_2=(q_{21}, q_{22}, \ldots, q_{2M})$, and $Q_3=(q_{31}, q_{32}, \ldots, q_{3M})$. Herein, $q_{11}$, $q_{21}$, and $q_{31}$ successively increase. Values of al may be divided by $q_{11}$, $q_{21}$, and $q_{31}$ into four intervals: an interval 1, an interval 2, an interval 3, and an interval 4. The interval 1 is a numerical interval less than $q_{11}$, the interval 2 is a numerical interval greater than or equal to qui and less than $q_{21}$, the interval 3 is a numerical interval greater than or equal to $q_{21}$ and less than $q_{31}$, and the interval 4 is a numerical interval greater than or equal to $q_{21}$. Correspondingly, binary data obtained by performing binarization on $a_1$ corresponds to one of the interval 1, the interval 2, the interval 3, and the interval 4. For example, when $a_1$ is less than $q_{11}$, the binary data obtained by performing binarization on $a_1$ is 000; when $a_1$ is greater than or equal to $q_{11}$ and less than $q_{21}$, the binary data obtained by performing binarization on $a_1$ is 100; when $a_1$ is greater than or equal to $q_{21}$ and less than $q_{31}$, the binary data obtained by performing binarization on $a_1$ is 110; when $a_1$ is greater than or equal to $q_{31}$, the binary data obtained by performing binarization on $a_1$ is 111. Optionally, $q_{11}$ may be a minimum value in a value range of $a_1$. Correspondingly, values of $a_1$ may be divided by $q_1$, $q_{21}$, and $q_{31}$ into three intervals: the interval 2, the interval 3, and the interval 4. Alternatively, $q_{31}$ may be a maximum value in a value range of $a_1$. Correspondingly, values of $a_1$ may be divided by $q_{11}$, $q_{21}$, and $q_{31}$ into three intervals: the interval 1, the interval 2, and the interval 3.

In some embodiments, the binary data may include multi-bit binary data corresponding to each of components of the 3D map descriptor, and a quantity of values 1 or 0 in multi-bit binary data corresponding to any component of the components indicates a preset threshold vector corresponding to the component in the quantization. For example, multi-bit binary data corresponding to an $i^{th}$ component $a_i$ of the 3D map descriptor is: $h_{1i}, h_{2i}, \ldots, h_{Ni}$, that is, N pieces of bit information. A quantity of values 1 or 0 in the N pieces of bit information indicates a preset threshold vector corresponding to $a_i$ in the quantization. For example, if the quantity of values 1 or 0 in the N pieces of bit information is 2, $q_2i$ in $Q_2$ is subtracted from $a_i$ in the quantization.

Optionally, components at a same position of the N preset threshold vectors may not successively increase or successively decrease, and may be properly set as required.

In some embodiments, at least one bit in the binary data further indicates a quantity of bits in quantized data obtained through subsequent quantization. The at least one bit may reuse the binary data obtained through the binarization, or may not reuse the binary data obtained through the binarization. For example, another bit indicates a quantity of bits in quantized data obtained through subsequent quantization. Optionally, the at least one bit may be determined based on the binary data obtained through the binarization. Different binary data obtained through binarization corresponds to different threshold ranges (for example, the numerical interval described above), and the different threshold ranges may be different threshold ranges obtained through division by components at a same position of the N preset threshold vectors.

S504: Determine, based on the difference value of each component, an absolute value of a difference value between each component of the 3D map descriptor and a corresponding component of a target preset threshold vector.

The N difference value vectors are obtained by using S502, and each difference value vector includes difference values of components, that is, N*M difference values. In other words, each component in M components of the 3D map descriptor corresponds to N difference values. In this embodiment, a relatively small difference value may be selected from the N difference values corresponding to each component as a difference value of the component of the 3D map descriptor, to obtain an absolute value of the difference value of the component. Preset threshold vectors corresponding to components in the M components may be the same or may be different. For example, $a_1$ corresponds to qui in $Q_1$, $a_2$ corresponds to $q_{12}$ in $Q_1$, $\ldots$, and $a_M$ corresponds to $q_{NM}$ in $Q_N$. The target preset threshold vector is $(q_{11}, q_{12}, \ldots, q_{NM})$. D" is an absolute value of a difference value between each component of the 3D map descriptor and a corresponding component of the target preset threshold vector. The absolute value of the difference value between each component of the 3D map descriptor and the corresponding component of the target preset threshold vector is: an absolute value of $a_1$ minus $q_{11}$, an absolute value of $a_2$ minus $q_{12}$, $\ldots$, an absolute value of $a_M$ minus $q_{NM}$.

S505: Perform quantization on the absolute value of the difference value between each component of the 3D map descriptor and the corresponding component of the target preset threshold vector, to obtain quantized data.

The quantization may be the foregoing scalar quantization, vector quantization, product quantization, or another quantization manner. The compressed data of the 3D map descriptor may be obtained by using the foregoing steps, and the compressed data of the 3D map descriptor may include the binary data and the quantized data. The compressed data of the 3D map descriptor may be stored, to save storage space. Alternatively, the compressed data of the 3D map descriptor may be encapsulated and transmitted, to reduce resource overheads required for transmitting the 3D map.

In this embodiment, binarization is performed on the magnitude relationship between the 3D map descriptor and the preset threshold vector to obtain the binary data, and quantization is performed on the absolute value of the difference value between the 3D map descriptor and the preset threshold vector to obtain the quantized data. A quantity of bits in the binary data and the quantized data is less than a quantity of bits in an original 3D map descriptor, to save storage space and/or transmission resource overheads. A plurality of preset threshold vectors are used for binarization, so that a threshold can be flexibly selected for quantization, to reduce a data volume of the quantized data.

In the foregoing embodiment, one-stage binarization and one-stage quantization are used as an example for description. In embodiments of this application, compression may also be performed by using multi-stage binarization and multi-stage quantization. Any stage of binarization in the multi-stage binarization may use the foregoing binarization manner, and any stage of quantization in the multi-stage quantization may use the foregoing quantization manner. In an example for description, for one component $a_1$ of a 3D map descriptor, three preset threshold vectors are used as an example: $Q_1=(q_{11}, q_{12}, \ldots, q_{1M})$, $Q_2=(q_{21}, q_{22}, \ldots, q_{2M})$, and $Q_3=(q_{31}, q_{32}, \ldots, q_{3M})$. Herein, for example, $q_{11}$, $q_{21}$, and $q_{31}$ successively increase. One stage of binarization in two-stage binarization may use $q_{21}$ to obtain binary data whose length may be 1, and one stage of quantization in subsequent two-stage quantization may use $a_1$-$q_{21}$ for quantization. The other stage of binarization in the two-stage binarization may use $q_1$, $q_{21}$, and $q_{31}$ to obtain binary data whose length may be 3, and the other stage of quantization in the subsequent two-stage quantization may use one of $a_1$-$q_{11}$, $a_1$-$q_{21}$, and $a_1$-$q_{31}$ for quantization. For example, when the binary data obtained by using $q_{11}$, $q_{21}$, and $q_{31}$ is 111, quantization may be performed by using $a_1$-$q_{31}$; when the binary data obtained by using $q_{11}$, $q_{21}$, and $q_{31}$ is 110, quantization may be performed by using $a_1$-$q_{21}$. In such a compression manner, decompression can be performed according to a precision requirement by using a corresponding stage of decompression.

Refer to FIG. 10. FIG. 10 is a schematic flowchart of a method for decompressing a 3D map according to an embodiment of this application. In some implementations, the method may be applied to the electronic device (for example, the first electronic device or the second electronic device) in any one of examples of FIG. 1 to FIG. 4f, or may be applied to the server in any one of examples of FIG. 1 to FIG. 4f. An execution body for performing the method for decompressing a 3D map in embodiments of this application may also be referred to as a decompressor end or a decoder end. The method includes but is not limited to the following steps.

S601: Obtain compressed data of a 3D map, where the compressed data includes binary data and quantized data.

The binary data and the quantized data may be obtained by using the embodiment shown in FIG. 7.

S602: Perform dequantization on the quantized data to obtain dequantized data.

DQ" is the dequantized data, and the dequantized data may be an absolute value of a difference value between each component of a reconstructed 3D map descriptor and a component corresponding to a target preset threshold vector. The target preset threshold vector may be the target preset threshold vector in S504 in the embodiment shown in FIG. 9. The absolute value of the difference value between each component of the reconstructed 3D map descriptor and the corresponding component of the target preset threshold vector may be recovered from the quantized data through dequantization. For example, the dequantization process may be an inverse process of the quantization in the embodiment shown in FIG. 9.

S603: Determine a target preset threshold vector from N preset threshold vectors based on the binary data.

The binary data may include multi-bit binary data corresponding to each of components of the reconstructed 3D map descriptor, and a quantity of values 1 or 0 in multi-bit binary data corresponding to any component of the components indicates a preset threshold vector corresponding to the component in the quantization. For example, multi-bit binary data corresponding to an $i^{th}$ component $a_i$ of the reconstructed 3D map descriptor is: $h_{1i}$, $h_{2i}$, . . . , $h_{Ni}$, that is, N pieces of bit information. A quantity of values 1 or 0 in the N pieces of bit information indicates a preset threshold vector corresponding to $a_i$ in the dequantization. For example, if the quantity of values 1 or 0 in the N pieces of bit information is 2, the preset threshold vector corresponding to $a_i$ is $Q_2$, that is, $q_{2i}$ in $Q_2$ is used for subsequently recovering the $i^{th}$ component of the reconstructed 3D map descriptor.

For example, it may be determined, based on the binary data, that $a_1$ corresponds to $q_{11}$ in $Q_1$, $a_2$ corresponds to $q_{12}$ in $Q_1$, . . . , and $a_M$ corresponds to $q_{NM}$ in $Q_N$. The target preset threshold vector is ($q_{11}$, $q_{12}$, . . . , $q_{NM}$).

S604: Obtain the reconstructed 3D map descriptor based on the dequantized data and the target preset threshold vector.

During compression, from each component of the 3D map descriptor, the corresponding component of the target preset threshold vector is subtracted, to obtain the difference value of each component. Therefore, during decompression, the difference value of each component is added to the corresponding component of the target preset threshold vector, to obtain components of the reconstructed 3D map descriptor. D_recover is the reconstructed 3D map descriptor. D_recover=DQ'+Q. Q is the target preset threshold vector.

It should be noted that this embodiment is described by using an example in which during compression, from each component of the 3D map descriptor, the corresponding component of the target preset threshold vector is subtracted, and during decompression, the difference value of each component is added to the corresponding component of the target preset threshold vector. Another manner may alternatively be used. For example, during compression, each component of the 3D map descriptor is added to the corresponding component of the target preset threshold vector, and during decompression, from the difference value of each component, the corresponding component of the target preset threshold vector is subtracted. This embodiment of this application is not limited thereto.

Further description is given by using an example in which the target preset threshold is ($q_{11}$, $q_{12}$, . . . , $q_{NM}$). DQ"= ($dq_1$", $dq_2$", . . . , $dq_{qM}$"). The reconstructed 3D map descriptor is $dq_1$" plus $q_{11}$, $dq_2$" plus $q_{12}$, . . . , $dq_M$" plus $q_{NM}$.

In this embodiment, the binary data and the quantized data of the 3D map descriptor are obtained, and the reconstructed 3D map descriptor is obtained based on the binary data and the quantized data. A quantity of bits in the binary data and the quantized data is less than a quantity of bits in an original 3D map descriptor, to save storage space and/or transmission resource overheads. The compressed data of the 3D map is decompressed to obtain the reconstructed 3D map descriptor, so as to perform subsequent processing, for example, positioning by using the reconstructed 3D map descriptor.

Figure 11B:
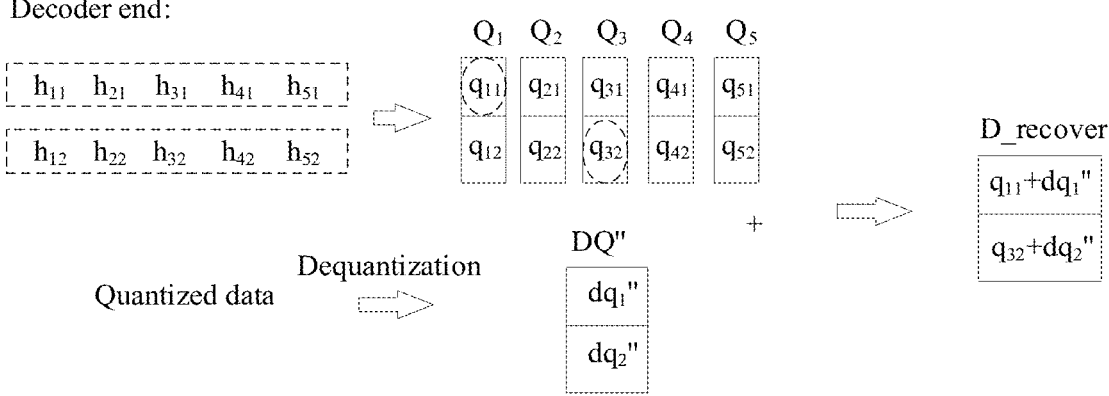

FIG. 11A and FIG. 11B are schematic diagrams of processes for encoding and decoding a 3D map according to an embodiment of this application. As shown in FIG. 11A, an encoder end compresses a 3D map descriptor D, where D=($a_1$, $a_2$). The encoder end subtracts five preset threshold vectors ($Q_1$, $Q_2$, $Q_3$, $Q_4$, $Q_5$) from D, to obtain five difference value vectors ($D_1$', $D_2$', $D_3$', $D_4$', $D_5$'). $Q_1$=($q_{11}$, $q_{12}$), $Q_2$= ($q_{21}$, $q_{22}$), $Q_3$=($q_{31}$, $q_{32}$), $Q_4$=($q_{41}$, $q_{42}$), and $Q_5$=($q_{51}$, $q_{52}$). As shown in FIG. 11A, $D_1$'=($a_1$-$q_{11}$, $a_2$-$q_{12}$), $D_2$'=($a_1$-$q_{21}$, $a_2$-$q_{22}$), $D_3$'=($a_1$-$q_{31}$, $a_2$-$q_{32}$), $D_4$'=($a_1$-$q_{41}$, $a_2$-$q_{42}$), and $D_5$'= ($a_1$-$q_{51}$, $a_2$ $q_{52}$). Binarization is performed on the five difference value vectors ($D_1$', $D_2$', $D_3$', $D_4$', $D_5$') to obtain corresponding binary data ($H_1$, $H_2$, $H_3$, $H_4$, $H_5$). Multi-bit binary data corresponding to $a_1$ and multi-bit binary data corresponding to $a_2$ may be obtained based on the binary data ($H_1$, $H_2$, $H_3$, $H_4$, $H_5$). For example, the multi-bit binary data corresponding to $a_1$ may be $h_{11}$, $h_{21}$, $h_{31}$, $h_{41}$, and $h_{51}$ in a dashed box shown in FIG. 11A; the multi-bit binary data corresponding to $a_2$ may be $h_{12}$, $h_{22}$, $h_{32}$, $h_{42}$, and $h_{52}$ in a dashed box shown in FIG. 11A. Quantization is performed on the five difference value vectors ($D_1$', $D_2$', $D_3$', $D_4$', $D_5$') to obtain corresponding quantified data. In an implementable manner, one of $a_1$-$q_{11}$, $a_1$-$q_{21}$, $a_1$-$q_{31}$, $a_1$-$q_{41}$, and $a_1$-$q_{51}$ whose absolute value is the smallest is selected for quantification. For example, $a_1$-$q_{11}$ in a dashed circle shown in FIG. 11A is selected, and an absolute value of $a_1$-$q_{11}$ is obtained for quantification. Similarly, one of $a_2$-$q_{12}$, $a_2$-$q_{22}$, $a_2$-$q_{32}$, $a_2$-$q_{42}$, and $a_2$-$q_{52}$ whose absolute value is the smallest is selected for quantification. For example, $a_2$-$q_{32}$ in a dashed circle shown in FIG. 11A is selected, and an absolute value of $a_2\text{-}q_{32}$ is obtained for quantification, to obtain quantized data. A decoder end performs dequantization on the quantized data to obtain DQ". $q_{11}$ in a dashed circle shown in FIG. 11B is found in the five preset threshold vectors based on binary data ($h_{11}$, $h_{21}$, $h_{31}$, $h_{41}$, $h_{51}$). $q_{32}$ in a dashed circle shown in FIG. 11B is found in the five preset threshold vectors based on binary data ($h_{12}$, $h_{22}$, $h_{32}$, $h_{42}$, $h_{52}$). $q_{11}$ and $q_{32}$ are the foregoing target preset vector, and DQ" is correspondingly added to the target preset threshold vector, to obtain the reconstructed 3D map descriptor. D_recover is the reconstructed 3D map descriptor. D_recover=DQ'+Q. Q is the target preset threshold vector. As shown in FIG. 11B, D_recover=($q_{11}$+$dq_1$", $q_{32}$+$dq_2$").

The foregoing describes in detail the methods for compressing and decompressing a 3D map in embodiments of this application with reference to the accompanying drawings. The following describes apparatuses for compressing and decompressing a 3D map in embodiments of this application with reference to FIG. 12 and FIG. 13. It should be understood that the apparatus for compressing a 3D map can perform the method for compressing a 3D map in embodiments of this application, and the apparatus for decompressing a 3D map can perform the method for decompressing a 3D map in embodiments of this application. To avoid unnecessary repetition, the following appropriately omits repeated descriptions when describing the apparatuses for compressing and decompressing a 3D map in embodiments of this application.

Figure 12:
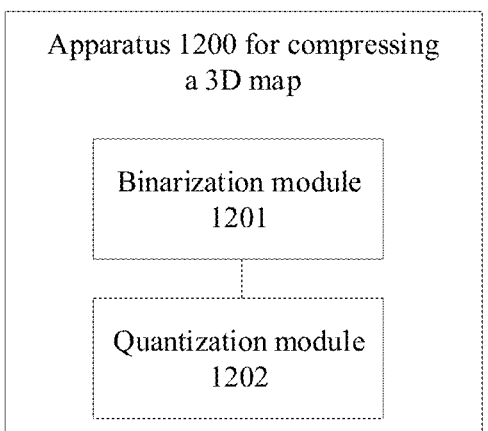
FIG. 12 is a schematic diagram of a structure of an apparatus for compressing a 3D map according to an embodiment of this application.

Refer to FIG. 12. FIG. 12 is a schematic diagram of a structure of an apparatus for compressing a 3D map according to an embodiment of this application. As shown in FIG. 12, the apparatus 1200 for compressing a 3D map may include a binarization module 1201 and a quantization module 1202.

The binarization module 1201 is configured to obtain a 3D map descriptor, where the 3D map descriptor corresponds to at least one 3D map point of a 3D map. The binarization module 1201 is further configured to perform binarization on a relationship between the 3D map descriptor and at least one preset threshold vector to obtain binary data. The quantization module 1202 is configured to perform quantization on a difference between the 3D map descriptor and the at least one preset threshold vector to obtain quantized data.

In some embodiments, the apparatus may further include an encapsulation module 1203, configured to encapsulate the binary data and the quantized data to obtain a bitstream of the 3D map.

In some embodiments, the apparatus may further include: a transmission module 1204, configured to receive 3D map request information sent by an electronic device, and send, to the electronic device in response to the 3D map request information, the bitstream of the 3D map corresponding to the 3D map request information; or a transmission module 1204, configured to send the bitstream of the 3D map to a server.

In some embodiments, the relationship between the 3D map descriptor and the at least one preset threshold vector includes a magnitude relationship between each component of the 3D map descriptor and a corresponding component of the at least one preset threshold vector.

In some embodiments, the difference between the 3D map descriptor and the at least one preset threshold vector includes: a difference value between or an absolute value of a difference value between each component of the 3D map descriptor and a corresponding component of the at least one preset threshold vector.

In some embodiments, the binarization module 1201 is further configured to: subtract, from each component of the 3D map descriptor, a corresponding component of the at least one preset threshold vector, to obtain a difference value of each component; and determine the magnitude relationship based on the difference value of each component.

In some embodiments, at least one component of the at least one preset threshold vector used for the quantization is any one of corresponding components of the at least one preset threshold vector used for the binarization.

In some embodiments, one preset threshold vector in the at least one preset threshold vector used for the binarization is a minimum threshold vector or a maximum threshold vector, each component of the minimum threshold vector is less than or equal to a minimum value of a value range of a corresponding component of the 3D map descriptor, and each component of the maximum threshold vector is greater than or equal to a maximum value of a value range of a corresponding component of the 3D map descriptor.

In some embodiments, when the at least one preset threshold vector used for the binarization includes N preset threshold vectors, components at a same position of the N preset threshold vectors successively increase or decrease, where N is an integer greater than 1; and successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, where $2 \leq i \leq N$.

In some embodiments, the binary data includes multi-bit binary data corresponding to each of components of the 3D map descriptor, and a quantity of values 1 or 0 in multi-bit binary data corresponding to any component of the components indicates a component of a preset threshold vector corresponding to the component.

In some embodiments, the at least one preset threshold vector used for the quantization is the same as the at least one preset threshold vector indicated by the binary data for quantization.

In some embodiments, the at least one component of the at least one preset threshold vector used for the quantization is obtained based on the binary data.

In some embodiments, at least one bit in the binary data further indicates a quantity of bits in the quantized data.

It should be noted that the apparatus 1200 for compressing a 3D map may perform the apparatus method for compressing a 3D map in the embodiment shown in FIG. 5, FIG. 7, or FIG. 9. For exemplary implementation principles and technical effects, refer to the specific explanations and descriptions of the foregoing method embodiment. Details are not described herein again.

Figure 13:
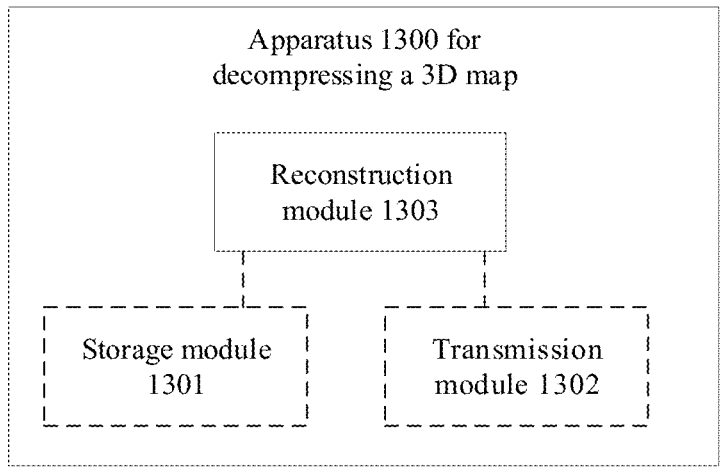
FIG. 13 is a schematic diagram of a structure of an apparatus for decompressing a 3D map according to an embodiment of this application.

Refer to FIG. 13. FIG. 13 is a schematic diagram of a structure of an apparatus for decompressing a 3D map according to an embodiment of this application. As shown in FIG. 13, the apparatus 1300 for decompressing a 3D map may include a storage module 1301 or a transmission module 1302, and a reconstruction module 1303.

The reconstruction module 1303 is configured to obtain the compressed data of a 3D map by using the storage module 1301 or the transmission module 1302, where the compressed data includes binary data and quantized data.

The reconstruction module 1303 is configured to obtain a reconstructed 3D map descriptor based on the binary data and the quantized data.

In a possible design, the reconstruction module 1303 is configured to: obtain a bitstream of the 3D map by using the transmission module 1302, and decapsulate the bitstream of the 3D map to obtain the compressed data of the 3D map.

In a possible design, the transmission module 1302 is configured to: send 3D map request information, and receive the bitstream of the 3D map corresponding to the 3D map request information; or the transmission module 1302 is configured to receive the bitstream of the 3D map.

In a possible design, the reconstruction module 1303 is configured to: perform dequantization on the quantized data to obtain a difference between the reconstructed 3D map descriptor and at least one preset threshold vector; and obtain the reconstructed 3D map descriptor based on the difference, the binary data, and the at least one preset threshold vector, where the binary data indicates a relationship between the reconstructed 3D map descriptor and the at least one preset threshold vector.

In a possible design, the relationship between the reconstructed 3D map descriptor and the at least one preset threshold vector includes: a magnitude relationship between each component of the reconstructed 3D map descriptor and a corresponding component of the at least one preset threshold vector.

In a possible design, the difference between the reconstructed 3D map descriptor and the at least one preset threshold vector includes: a difference value between or an absolute value of a difference value between each component of the reconstructed 3D map descriptor and a corresponding component of the at least one preset threshold vector.

In a possible design, the binary data further indicates the at least one preset threshold vector, and the reconstruction module is further configured to: determine the at least one preset threshold vector based on the binary data and N preset threshold vectors. Components at a same position of the N preset threshold vectors successively increase or decrease, where N is an integer greater than 1; and successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, where $2 \leq i \leq N$.

In a possible design, the binary data includes multi-bit binary data corresponding to each of components of the reconstructed 3D map descriptor, and a quantity of values 1 or 0 in multi-bit binary data corresponding to any component of the components indicates a component of a preset threshold vector corresponding to the component.

In a possible design, at least one bit in the binary data further indicates a quantity of bits in the quantized data.

It should be noted that the apparatus 1300 for decompressing a 3D map may perform the apparatus method for decompressing a 3D map in the embodiment shown in FIG. 6, FIG. 8, or FIG. 10. For exemplary implementation principles and technical effects, refer to the specific explanations and descriptions of the foregoing method embodiment. Details are not described herein again.

Figure 14:
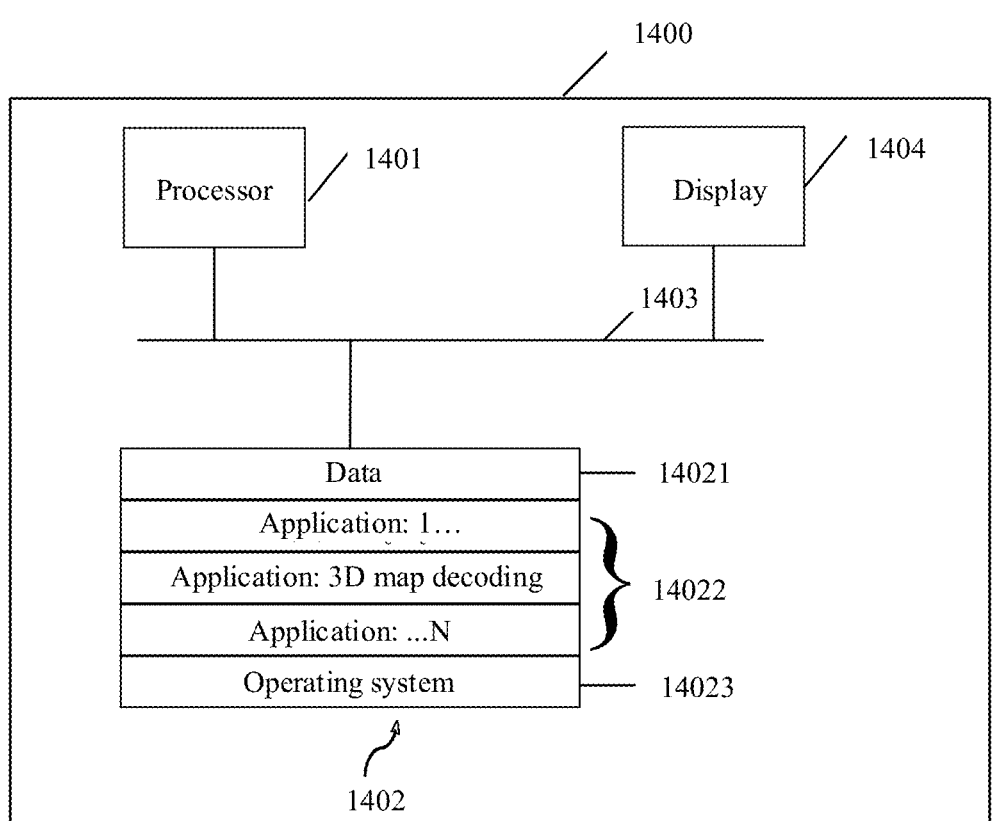
FIG. 14 is a schematic block diagram of a decoding apparatus 1400 according to an embodiment of this application.

FIG. 14 is a schematic block diagram of an implementation of a decoding apparatus 1400 according to an embodiment of this application. The decoding apparatus 1400 may include a processor 1401, a memory 1402, and a bus system 1403. The processor 1401 and the memory 1402 are connected through the bus system 1403. The memory 1402 is configured to store instructions. The processor 1401 is configured to execute the instructions stored in the memory 1402, to perform various methods for compressing or decompressing a 3D map described in this application. To avoid repetition, details are not described herein again.

In this embodiment of this application, the processor 1401 may be a central processing unit (CPU), or the processor 1401 may be another general-purpose processor, a DSP, an ASIC, an FPGA or another programmable logic device, a discrete gate or a transistor logic device, a discrete hardware component, or the like. The general-purpose processor may be a microprocessor, or the processor may be any conventional processor or the like.

The memory 1402 may include a ROM device or a RAM device. Any other proper type of storage device may also be used as the memory 1402. The memory 1402 may include code and data 14021 that are accessed by the processor 1401 through the bus 1403. The memory 1402 may further include an operating system 14023 and an application 14022. The application 14022 includes at least one program that allows the processor 1401 to perform the method for compressing or decompressing a 3D map described in this application. For example, the application 14022 may include applications 1 to N, and further include a 3D map compression or decompression application (briefly referred to as a 3D map decoding application) that performs the method for compressing or decompressing a 3D map described in this application.

The bus system 1403 may further include a power bus, a control bus, a status signal bus, and the like, in addition to a data bus. However, for clarity of description, various types of buses in the figure are denoted as the bus system 1403.

Optionally, the decoding apparatus 1400 may further include one or more output devices, such as a display 1404. In an example, the display 1404 may be a touch display that combines a display and a touch unit that operably senses a touch input. The display 1404 may be connected to the processor 1401 through the bus 1403.

It should be noted that the decoding apparatus 1400 may perform the method for compressing a 3D map in this application, or may perform the method for decompressing a 3D map in this application.

A person skilled in the art can understand that the functions described with reference to various illustrative logical blocks, modules, and algorithm steps disclosed and described in this specification can be implemented by hardware, software, firmware, or any combination thereof. If the functions are implemented by software, the functions described with reference to the illustrative logical blocks, modules, and steps may be stored in or transmitted over a computer-readable medium as one or more instructions or code and executed by a hardware-based processing unit. The computer-readable medium may include a computer-readable storage medium corresponding to a tangible medium, such as a data storage medium, or any communication medium that facilitates transmission of a computer program from one place to another (for example, according to a communication protocol). In this manner, the computer-readable medium may generally correspond to (1) a non-transitory tangible computer-readable storage medium, or (2) a communication medium such as a signal or a carrier. The data storage medium may be any usable medium that can be accessed by one or more computers or one or more processors to retrieve instructions, code, and/or data structures for implementing the technologies described in this application. A computer program product may include a computer-readable medium.

In an example but not a limitation, such computer-readable storage media may include a RAM, a ROM, an EEPROM, a CD-ROM or another compact disc storage apparatus, a magnetic disk storage apparatus or another magnetic storage apparatus, a flash memory, or any other medium that can be used to store desired program code in a form of instructions or a data structure and that is accessible by a computer. In addition, any connection is properly referred to as a computer-readable medium. For example, if instructions are transmitted from a website, a server, or another remote source through a coaxial cable, an optical fiber, a twisted pair, a digital subscriber line (DSL), or a wireless technology such as infrared, radio, or microwave, the coaxial cable, the optical fiber, the twisted pair, the DSL, or the wireless technology such as infrared, radio, or microwave is included in a definition of the medium. However, it should be understood that the computer-readable storage medium and the data storage medium do not include connections, carriers, signals, or other transitory media, but actually mean non-transitory tangible storage media. Disks and discs used in this specification include a compact disc (CD), a laser disc, an optical disc, a digital versatile disc (DVD), and a Blu-ray disc. The disks usually reproduce data magnetically, whereas the discs reproduce data optically by using lasers. Combinations of the foregoing items should also be included in the scope of the computer-readable media.

Instructions may be executed by one or more processors such as one or more digital signal processors (DSPs), general microprocessors, application-specific integrated circuits (ASICs), field-programmable gate arrays (FPGAs), or other equivalent integrated or discrete logic circuits. Therefore, the term "processor" used in this specification may refer to the foregoing structure, or any other structure that may be applied to implementation of the technologies described in this specification. In addition, in some aspects, the functions described with reference to the illustrative logical blocks, modules, and steps described in this specification may be provided within dedicated hardware and/or software modules configured for encoding and decoding, or may be incorporated into a combined codec. In addition, the technologies may be completely implemented in one or more circuits or logic elements.

The technologies in this application may be implemented in various apparatuses or devices, including a wireless handset, an integrated circuit (IC), or a set of ICs (for example, a chip set). Various components, modules, or units are described in this application to emphasize functional aspects of apparatuses configured to perform the disclosed techniques, but do not necessarily require realization by different hardware units. Actually, as described above, various units may be combined into a codec hardware unit in combination with appropriate software and/or firmware, or may be provided by interoperable hardware units (including the one or more processors described above).

The foregoing descriptions are merely exemplary implementations of this application, but the protection scope of this application is not limited thereto. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An apparatus for compressing a three-dimensional (3D) map, wherein the apparatus comprises one or more processors and a memory coupled to the one or more processors, the memory comprises instructions, and when the instructions are executed by the one or more processors, cause the apparatus to perform:

obtaining a 3D map descriptor, wherein the 3D map descriptor corresponds to at least one 3D map point of the 3D map;

performing binarization on a relationship between the 3D map descriptor and at least one preset threshold vector to obtain binary data; and performing quantization on a difference between the 3D map descriptor and the at least one preset threshold vector to obtain quantized data;

encapsulating the binary data and the quantized data to obtain a bitstream of the 3D map; and performing one of:

receiving 3D map request information sent by an electronic device, and sending, to the electronic device in response to the 3D map request information, the bitstream of the 3D map corresponding to the 3D map request information; or sending the bitstream of the 3D map to a server, wherein the at least one preset threshold vector comprises N preset threshold vectors, wherein each preset threshold vector comprises a plurality of components each corresponding to a dimension of the preset threshold vector, wherein components at a same position of the N preset threshold vectors successively increase or decrease, and successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, wherein $2 \leq i \leq N$;

wherein each bit of the binary data corresponds to a particular component of a particular preset threshold vector and indicates whether that particular component of that particular preset threshold vector is selected for quantization.

2. The apparatus according to claim 1, wherein the relationship between the 3D map descriptor and the at least one preset threshold vector comprises a magnitude relationship between each component of the 3D map descriptor and a corresponding component of the at least one preset threshold vector.

3. The apparatus according to claim 2, wherein the instructions further comprise:

subtracting, from each component of the 3D map descriptor, the corresponding component of the at least one preset threshold vector, to obtain a difference value of each component; and determining the magnitude relationship based on the difference value of each component.

4. The apparatus according to claim 2, wherein one preset threshold vector in the at least one preset threshold vector used for the binarization is a minimum threshold vector or a maximum threshold vector, each component of the minimum threshold vector is less than or equal to a minimum value of a value range of a corresponding component of the 3D map descriptor, and each component of the maximum threshold vector is greater than or equal to a maximum value of a value range of a corresponding component of the 3D map descriptor.

5. The apparatus according to claim 1, wherein the difference between the 3D map descriptor and the at least one preset threshold vector comprises: a difference value between or an absolute value of a difference value between each component of the 3D map descriptor and the corresponding component of the at least one preset threshold vector.

6. The apparatus according to claim 1, wherein at least one component of the at least one preset threshold vector used for the quantization is any one of corresponding components of the at least one preset threshold vector used for the binarization.

7. The apparatus according to claim 1, wherein the at least one preset threshold vector used for the quantization is the same as the at least one preset threshold vector indicated by the binary data for quantization.

8. The apparatus according to claim 7, wherein at least one component of the at least one preset threshold vector used for the quantization is obtained based on the binary data.

9. The apparatus according to claim 1, wherein at least one bit in the binary data further indicates a quantity of bits in the quantized data.

10. An apparatus for decompressing a three-dimensional (3D) map, wherein the apparatus comprises one or more processors and a memory coupled to the one or more processors, the memory comprises instructions, and when the instructions are executed by the one or more processors, cause the apparatus to perform:

obtaining compressed data of the 3D map, wherein the compressed data comprises compressed data of a 3D map descriptor, wherein the compressed data of a 3D map descriptor comprises binary data and quantized data; and obtaining a reconstructed 3D map descriptor based on the binary data and the quantized data;

performing dequantization on the quantized data to obtain a difference between the 3D map descriptor and at least one preset threshold vector; and obtaining the reconstructed 3D map descriptor based on the difference, the binary data, and the at least one preset threshold vector, wherein the binary data indicates a relationship between the 3D map descriptor and the at least one preset threshold vector, wherein the at least one preset threshold vector is determined based on the binary data and N preset threshold vectors, wherein components at a same position of the N preset threshold vectors successively increase or decrease, wherein N is an integer greater than 1; and successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, wherein $2 \le i \le N$ and each bit of the binary data corresponds to a particular component of a particular preset threshold vector and indicates whether that particular component of that particular preset threshold vector is selected for quantization.

11. The apparatus according to claim 10, wherein the difference between the reconstructed 3D map descriptor and the at least one preset threshold vector comprises: a difference value between or an absolute value of a difference value between each component of the reconstructed 3D map descriptor and the corresponding component of the at least one preset threshold vector.

12. The apparatus according to claim 10, wherein at least one bit in the binary data further indicates a quantity of bits in the quantized data.

13. A method for compressing a three-dimensional (3D) map, applied to an apparatus that comprises one or more processors, wherein the method comprises:

obtaining, by the one or more processors, a 3D map descriptor, wherein the 3D map descriptor corresponds to at least one 3D map point of the 3D map;

performing, by the one or more processors, binarization on a relationship between the 3D map descriptor and at least one preset threshold vector to obtain binary data; and performing, by the one or more processors, quantization on a difference between the 3D map descriptor and the at least one preset threshold vector to obtain quantized data;

encapsulating the binary data and the quantized data to obtain a bitstream of the 3D map; and performing one of:

receiving 3D map request information sent by an electronic device, and sending, to the electronic device in response to the 3D map request information, the bitstream of the 3D map corresponding to the 3D map request information; or sending the bitstream of the 3D map to a server, wherein the at least one preset threshold vector comprises N preset threshold vectors, wherein each preset threshold vector comprises a plurality of components each corresponding to a dimension of the preset threshold vector, wherein components at a same position of the N preset threshold vectors successively increase or decrease, and successively increasing indicates that any component of an $i^{th}$ preset threshold vector in the N preset threshold vectors is greater than or equal to a component at a same position of an $(i-1)^{th}$ preset threshold vector, and successively decreasing indicates that any component of the $i^{th}$ preset threshold vector in the N preset threshold vectors is less than or equal to a component at a same position of the $(i-1)^{th}$ preset threshold vector, wherein $2 \le i \le N$;

wherein each bit of the binary data corresponds to a particular component of a particular preset threshold vector and indicates whether that particular component of that particular preset threshold vector is selected for quantization.

* * * * *